United States Patent [19]
Ebitani et al.

[11] Patent Number: 6,081,349
[45] Date of Patent: Jun. 27, 2000

[54] IMAGE PROCESSING DEVICE, IMAGE PROCESSING SYSTEM, AND METHOD FOR GENERATING SCREENS FOR IMAGE PROCESSING

[75] Inventors: Kenji Ebitani; Yuzuru Suzuki, both of Ebina, Japan

[73] Assignee: Fuji Xerox Co., Ltd., Tokyo, Japan

[21] Appl. No.: 08/859,273

[22] Filed: May 20, 1997

[30] Foreign Application Priority Data

May 20, 1996 [JP] Japan ................................. 8-124817
Apr. 16, 1997 [JP] Japan ................................. 9-099078

[51] Int. Cl.[7] .................................................. H04N 1/40
[52] U.S. Cl. ......................... 358/455; 358/457; 358/458; 358/536
[58] Field of Search ................................... 358/534, 535, 358/536, 455, 456, 457, 458; 382/237

[56] References Cited

U.S. PATENT DOCUMENTS

| | | | |
|---|---|---|---|
| 4,930,023 | 5/1990 | Yakame | 358/457 |
| 5,422,742 | 6/1995 | Ostromoukhov et al. | 358/536 |
| 5,745,660 | 4/1998 | Kolpatzik et al. | 358/457 |

FOREIGN PATENT DOCUMENTS

| | | |
|---|---|---|
| 52-49361 | 12/1977 | Japan . |
| 54-18302 | 2/1979 | Japan . |
| 55-76390 | 6/1980 | Japan . |
| 3-187676 | 8/1991 | Japan . |
| 5-110835 | 4/1993 | Japan . |

*Primary Examiner*—Thomas D. Lee
*Attorney, Agent, or Firm*—Oliff & Berridge, PLC

[57] ABSTRACT

An image processing system and method is presented which is capable of maintaining a high line count while preventing the generation of low-frequency periodic structures, using the supertiling method for image output devices such as printers. Threshold value matrix patterns are used for each supertile, and the input image data is compared with the threshold value. A dot pattern (binary image data) is generated based on the result of the comparison. Each supertile is divided up into a plurality (3×3) of halftone cells, and a dot pattern is generated for each halftone cell. A plurality of threshold value matrix patterns P1–P10 having identical shapes is used, and the pattern to be applied is selected randomly. This results in unevenness in the "centers of gravity" of the dots in the halftone cells. Thus, no periodic structures appear.

12 Claims, 26 Drawing Sheets

NUMBER OF
DIVISIONS ON
EACH SIDE=Z

| HALFTONE PATTERN | | | |
|---|---|---|---|
| 224 | 160 | 96 | 240 |
| 80 | 16 | 32 | 176 |
| 144 | 64 | 48 | 112 |
| 208 | 128 | 192 | 255 |

0-DEGREE SCREEN PATTERN

| WAVEFORM CONTROL PATTERN | | | |
|---|---|---|---|
| 0 | 0 | 1 | 1 |
| 0 | 0 | 1 | 1 |
| 0 | 0 | 1 | 1 |
| 0 | 0 | 1 | 1 |

WAVEFORM CONTROL PATTERN

FIG.18

| SCREEN ANGLE | THRESHOLD VALUE MATRIX PATTERN | | | | | |
|---|---|---|---|---|---|---|
| 0° | $P_0$ | $P_1$ | $P_2$ | $P_3$ | ... | $P_9$ |
| 15° | $P'_6$ | $P'_4$ | $P'_8$ | $P'_2$ | ... | $P'_3$ |
| 20° | $P''_7$ | $P''_5$ | $P''_2$ | $P''_1$ | ... | $P''_6$ |
| 45° | $P'''_5$ | $P'''_0$ | $P'''_7$ | $P'''_9$ | ... | $P'''_2$ |

FIG.26

IMAGE PROCESSING DEVICE, IMAGE PROCESSING SYSTEM, AND METHOD FOR GENERATING SCREENS FOR IMAGE PROCESSING

BACKGROUND OF THE INVENTION

1. Field of Invention

The present invention relates to image processing, and more particularly a system and method for generating image processor screens that are useful in copy machines and printers.

2. Description of Related Art

When color images are output to paper using primary color dot patterns, a slight offset in the angle of the primary color dot patterns can result in interference stripes known as "moires". For this reason, in the field of screen printing, screen angles are assigned beforehand to the screens for each of the primary colors. For example, a screen angle of 0 degrees could be used for yellow, 15 degrees for cyan, 45 degrees for black, and 75 degrees for magenta.

Japanese Examined Patent Publication Number 52-49361 and Japanese Examined Patent Publication Number 54-18302 disclose the implementation of this technology in digital circuitry. In the technology disclosed in these publications, a half-tone cell comprises twenty to several hundred image elements, and a repeating tile roughly in the shape of a square comprises a plurality of these half-tone cells. Halftones are reproduced based on the number of on and off image elements within the halftone cells.

Each image element in a halftone cell is assigned a prescribed threshold value, and each image element is turned on or off based on whether the threshold value is higher or lower than the image data. An example of this process is shown in FIG. 9, which shows a case where the level of input image data is 182.

The halftone cell here corresponds to a cell from the screen to be used in screen printing, so a screen angle is assigned to each primary color. However, in small-scale digital circuits, it is useful to use rational numbers for the tangents of the screen angles. Thus, if a screen angle is 15 degrees or 75 degrees (ideal screen angles), the tangent of the screen angle is approximated to a rational number.

The following is a summary description of the technology disclosed in Japanese Examined Patent Publication Number 52-49361, with reference to FIG. 1. In the figure, a supertile is made up of a group of half-tone cells formed roughly in the shape of a square and comprising 17 image elements each. The screen angle is the arctangent of ¼ (14.04 degrees, which is roughly 15 degrees).

In the drawing, the image elements numbered (1, 2, . . . , 17) are assigned ascending threshold values. Thus, as the image data levels become higher, a dot pattern is obtained that starts at the center of the halftone cells and appears to grow toward the edges.

In the illustrated pattern, it can be seen that the same pattern is repeated in both the primary scan direction and the secondary scan direction for each set of L image elements (L=17). Thus, a threshold memory of 17×17 words can be set up, and the contents of this memory can be repeatedly read so that an output image of an arbitrary size can be converted into halftone image data using this screen pattern.

According to the technology disclosed in Japanese Laid-open Publication Number 54-18302, the pattern shown in FIG. 1 can be further divided up into repeating patterns. The following is a description of this technology, with reference to FIG. 2. In FIG. 2, a rectangular area is examined, where this rectangle is made up of P image elements in the secondary scan direction (P=1 in this case) and L image elements in the primary scan direction (L=17 in this case).

The overall pattern in FIG. 2 is equivalent to repetitions of this rectangular block, where the block is repeated every L picture elements in the primary scan direction. In the secondary scan direction, the repeating blocks are shifted by S picture elements for each increment in the secondary scan direction. Thus, the same halftone image data can be obtained by reading from a threshold memory made up of 17×1 words while performing appropriate shifts. The image element counts L, P, and S are hereinafter referred to as the L parameter, the P parameter, and the S parameter, and these will be referred to collectively as the "cyclic parameters".

In the cases shown in FIG. 1 and FIG. 2, the screen angle can be approximated to an ideal value by increasing the size of the halftone cells. However, this decreases the number of lines that can be reproduced per unit length (hereinafter referred to as the line count). On the other hand, using a smaller halftone cell will increase the line count but will also introduce increased error in the actual screen angle relative to the ideal screen angle, which can result in moire patterns.

Japanese Laid-open Publication Number 3-187676 (U.S. patent application Ser. No. 434,924) and Japanese Laid-open Publication Number 5-110835 (U.S. patent application Ser. No. 652,927) disclose a technology where a supertile is divided up into a plurality of halftone cells, and dot patterns are generated for each halftone cell.

According to these technologies, increasing the size of the supertile results in a screen angle that can be closer to an ideal value, while relative high line counts can be maintained since the dot patterns are generated for small halftone cells.

FIG. 15 shows an example of such a supertile. In this example, 1 supertile is made up of 9 halftone cells. By repeating this supertile, a prescribed image area can be covered without gaps, as shown in FIG. 4. The sizes of the halftone cells do not need to be all identical. As an example, FIG. 3 shows a supertile made up half-tone cells which have image element counts of 231 as well as 232.

FIG. 7(a) shows the image region in FIG. 4 divided up by supertiles. The pattern number of the threshold value matrix pattern in each supertile is also shown. In conventional image processing devices, there is only 1 type of threshold value matrix pattern having a prescribed shape and image element count. Thus, the same pattern number (P1) is used throughout.

FIG. 7(b) shows an example of a dot pattern generated using the screen pattern from FIG. 7(a). In FIG. 7(b), there is a wider gap in the dot pattern occurring at a period three times that of the halftone cell. Visually, the image appears to have stripes. The reason for this is that the difference in areas between halftone cells is greater (in the example shown in FIG. 4, ¹⁄₁₄, which is approximately 7.1%), and also that the differences in the distance between the "centers of gravity" of the halftone cells are greater.

Thus, when the difference between the output resolution and the screen line count is small, the technology that involves simply dividing a supertile into halftone cells will generate low-frequency periodic structures. Furthermore, in the technology described above, the halftone cell is made relatively small, and this decreases the number of tone levels. These problems could be eliminated by increasing the size of the halftone cell, but this would unavoidably decrease the line count.

SUMMARY OF THE INVENTION

A first object of the present invention is to overcome the problems described above, and to provide an image processing device, an image processing system, and a method for generating screens for image processing in which high line counts are maintained while the generation of low-frequency periodic structures is prevented.

A second object of the present invention is to provide an image processing device, an image processing system, and a method for generating screens for image processing having good tonal characteristics.

In order to solve the problems described above and others, the present invention in one implementation comprises memory means storing a plurality of threshold value matrix patterns which serve as an element making up a screen, having mutually different dot growth patterns, pattern selecting means selecting from these threshold value matrix patterns at random, screen generating means arranging a threshold value matrix pattern selected by the pattern selecting means and generating a screen, and image converting means converting input image data into halftone image data by using the screen generated by screen generating means.

In another implementation, the present invention comprises memory means storing a plurality of threshold value matrix patterns which serve as an element making up a screen, having mutually different dot growth patterns, pattern selecting means selecting from these threshold value matrix patterns according to a prescribed sequence, screen generating means arranging a threshold value matrix pattern selected by the pattern selecting means and generating a screen, and image converting means converting input image data into halftone image data by using the screen generated by screen generating means.

In another implementation, the present invention comprises a step for storing into memory means a plurality of threshold value matrix patterns which serve as the elements making up a screen and which have mutually different dot growth patterns, a step for selecting these threshold value matrix patterns at random, a step for arranging selected threshold value matrix patterns and generating a screen, and a step for converting input image data into halftone image data using the screen.

In another implementation, the present invention comprises a step for storing into memory means a plurality of threshold value matrix patterns which serve as the elements making up a screen and which have mutually different dot growth patterns, a step for selecting these threshold value matrix patterns according to a prescribed sequence, a step for arranging selected threshold value matrix patterns and generating a screen, and a step for converting input image data into halftone image data using the screen.

In another implementation, the present invention comprises first memory means storing a plurality of growth weight value matrix patterns which serve as the elements making up a screen and which have mutually different dot growth patterns, pattern selecting means selecting these growth weight value matrix patterns at random, screen generating means arranging growth weight value matrix patterns selected by the pattern selecting means and generating a screen, and image converting means taking input image data and using the screen generated by screen generating means to perform conversion into halftone image data comprising data that has been quantized based on weight values in the growth weight value matrix pattern, and intermediate value data corresponding to a difference between one of the weight values and the image data.

In another implementation, the present invention comprises first memory means storing a plurality of growth weight value matrix patterns which serve as the elements making up a screen and which have mutually different dot growth patterns, pattern selecting means selecting these growth weight value matrix patterns according to a prescribed sequence, screen generating means arranging growth weight value matrix patterns selected by the pattern selecting means and generating a screen, and image converting means taking input image data and using the screen generated by screen generating means to perform conversion into halftone image data comprising data that has been quantized based on weight values in the growth weight value matrix pattern, and intermediate value data corresponding to a difference between one of the weight values and the image data.

In another implementation, the present invention comprises screen pattern memory means storing screen data made up of a plurality of threshold values or growth weight values, calculating means calculating a coordinate for storing the threshold value matrix pattern or growth weight value matrix pattern into screen pattern memory means based on the shape data of the threshold value matrix pattern or growth weight value matrix pattern, which are the elements that make up the screen, selecting means selecting a single threshold value matrix pattern or growth weight value matrix pattern out of the plurality of threshold value matrix patterns or growth weight value matrix patterns, writing means writing the threshold value matrix pattern or growth weight value matrix pattern selected by selecting means into screen pattern memory means based on calculation results from calculating means, and image converting means converting input image data into halftone image data using a screen saved in screen pattern memory means.

In another implementation, the present invention comprises an image processing system containing a data terminal and a data processing device wherein the data terminal comprises transmitting means for transmitting image data and screen attribute data for forming an image based on the image data and the data terminal comprises receiving means receiving the image data and the screen attribute data transmitted from the data terminal, matrix pattern generating means generating a plurality of threshold value matrix patterns or growth weight value matrix patterns having mutually different dot growth patterns and using the screen attribute data received using receiving means as one factor, screen generating means generating a screen by arranging dot patterns generated by matrix pattern generating means at random, and image converting means converting the image data received with receiving means into halftone image data using a screen generated by screen generating means.

As described above, in the invention threshold values to be assigned to a supertile or a halftone are selected randomly or according to a prescribed sequence. This makes it possible to effectively prevent low-frequency periodic structures. Also, according to alternative structures hereinafter described, it is possible to obtain halftone image data using intermediate data values. This makes it possible to maintain high line counts while providing adequate tonal characteristics.

BRIEF DESCRIPTION OF THE DRAWINGS

FIG. 18 illustrates the operation of an alternative example of the second illustrative embodiment of the invention;

FIG. 26 illustrates another alternative example of the invention.

DETAILED DESCRIPTION OF PREFERRED EMBODIMENTS

1. First Illustrative Embodiment 1.1. Structure of the Embodiment

Figure 13:
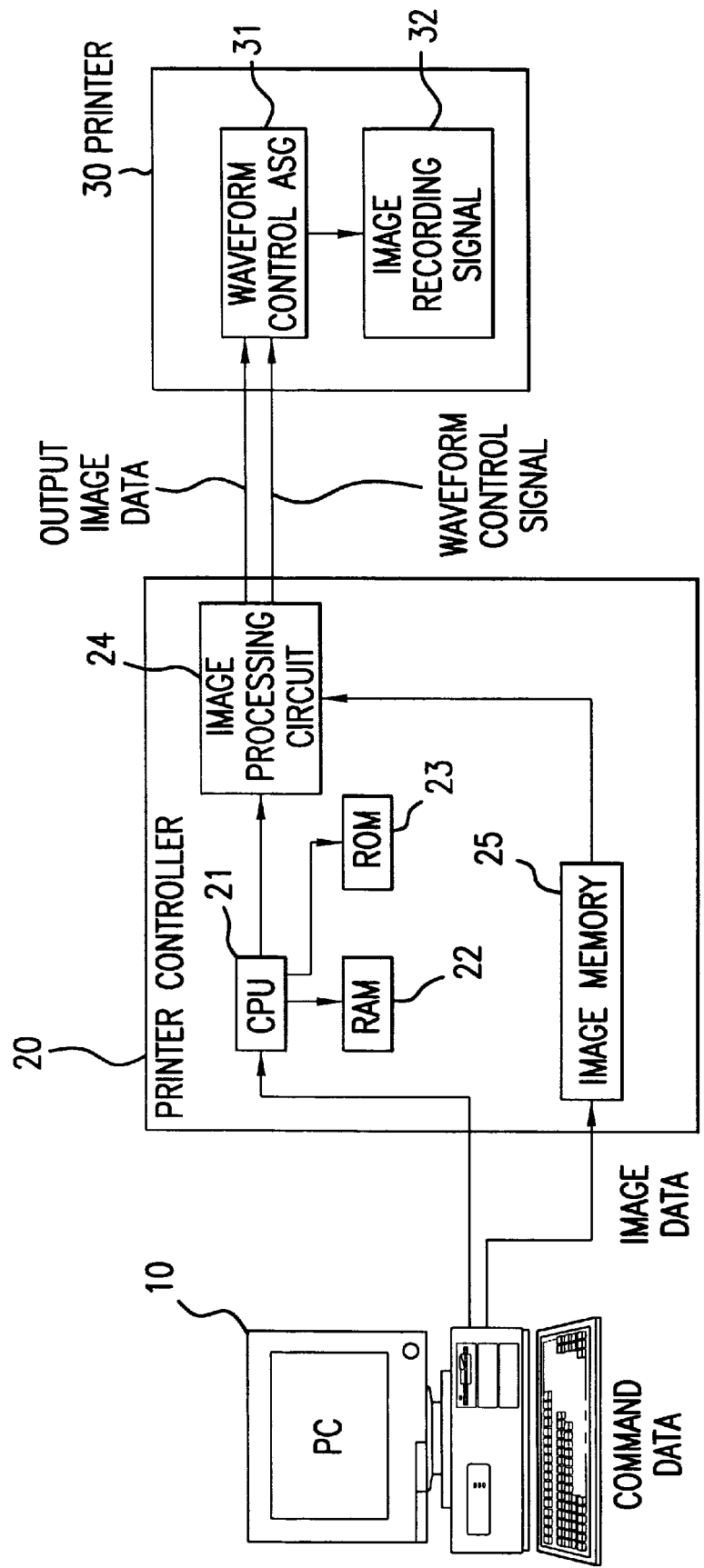
FIG. 13 illustrates a block diagram showing the overall structure of the first illustrative embodiment of the invention.

The overall structure of a first illustrative embodiment of the invention is made, referring to FIG. 13.

A personal computer 10 outputs image data and command data (screen attributes data). The command data refers to data specifying screen angles, line counts per unit length, and the like. A printer controller 20 contains an image memory 25. Image memory 25 contains color planes for the colors yellow, magenta, cyan, and black, and stores the image data mentioned above.

A CPU 21 interprets the command data according to a program stored in a ROM 23 and outputs various control signals, as will be appreciated by persons skilled in the art. These control signals include the dimensions of threshold value matrix patterns, L, P, and S parameters, and the like. The command data also includes grid-point functions such as line counts and screen angles. CPU 21 calculates parameters X, Y, and Z so that they satisfy equations (1) and (2) below.

Equation 1

$$\text{line count} = (\text{output resolution}) / \left( \left( \sqrt{X^2 + Y^2} \right) / Z \right)$$

Equation 2

$$\text{Angle} = \tan^{-1}(Y/X) \text{ in degrees.}$$

Figure 15:
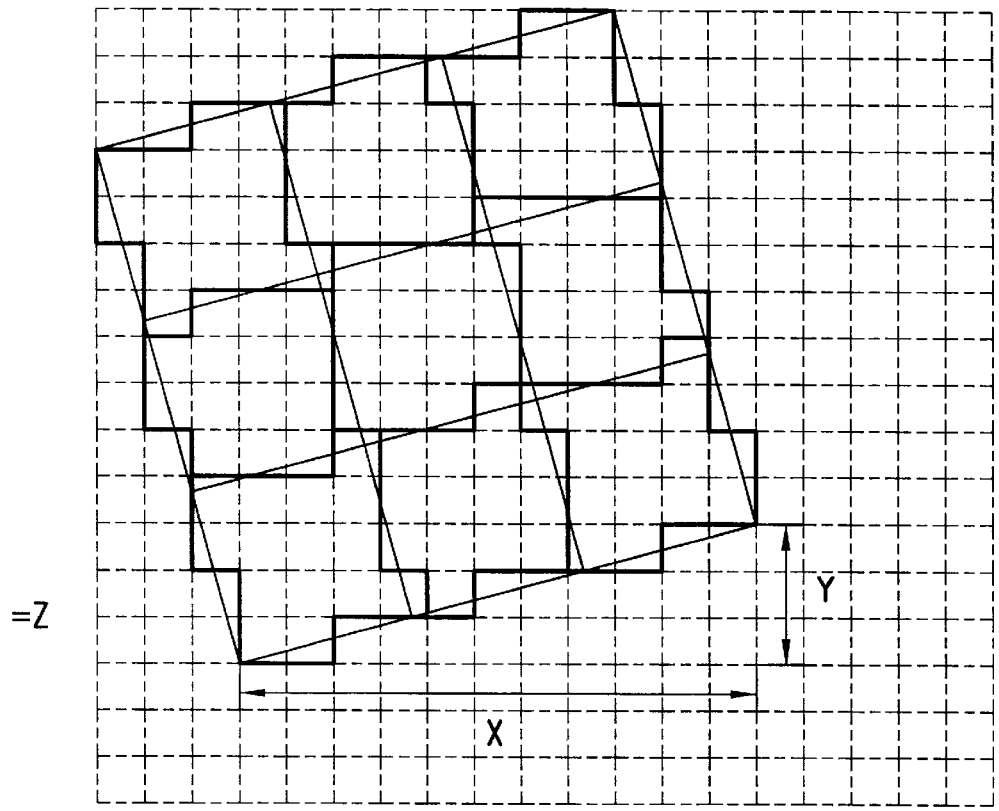
FIG. 15 illustrates a the operation of the first illustrative embodiment of the invention.

FIG. 15 shows parameters X and Y. Parameter Z is the number of divisions along one side of the supertile when the supertile is divided up into half-tone cells. In the example shown in FIG. 15, Z is 3. RAM 22 is used for operations performed by CPU 21. An image processing circuit 24 outputs waveform control signals and output image data based on the control signals and image data described above.

A printer 30 comprises a waveform control ASG 31 comparing a triangular wave and the output image data and outputting a laser modulated signal and an image recording section 32 performing electrophotographic image output based on this laser modulated signal.

Figure 5:
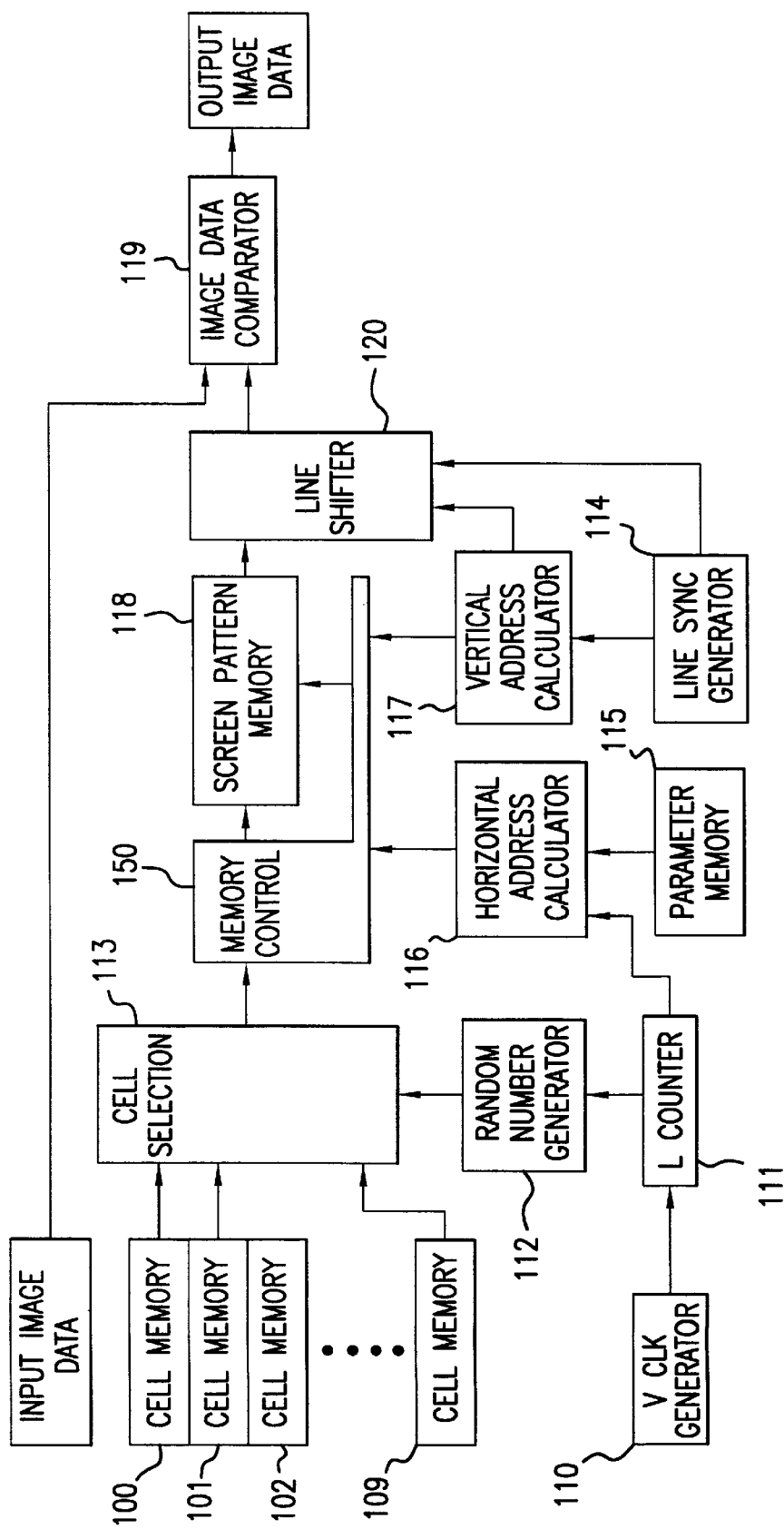
FIG. 5 illustrates a block diagram of the image processing circuit in a first illustrative embodiment of the invention.

FIG. 5 shows the structure of image processing circuit 24. Cell memory sections 100–109 store the threshold value matrix pattern corresponding to the supertile shown in FIG. 15. Cell memory sections 100–109 store threshold value matrix patterns that have identical shapes and image element counts.

However, there are slight variations in the threshold value matrix patterns stored in cell memory sections 100–109. When dot patterns are generated for halftone cells based on these threshold value matrix patterns, their "centers of gravity" are slightly different from one another. Thus, the threshold value matrix patterns stored in cell memory sections 100–109 will be distinguished by their pattern numbers, i.e. P1–P10.

A video clock generator 110 outputs a video clock VCLK having a prescribed period. An L counter 111 outputs an L-image-elements period signal each time video clock VCLK has been generated a number of times that corresponds to the L parameter. In this embodiment, the L, P, and S parameters are the parameters corresponding to those of the supertile shown in FIG. 15. The specific values of the parameters are determined uniquely by the shape of the supertile.

A random number generator 112 generates a random number in the range of 1, 2, . . . , 10 each time the L-image-elements period signal described above is generated. This random number is generated as a cell selection signal. A cell selection circuit 113 makes a selection from cell memory sections 100–109 based on the cell selection signal. The corresponding threshold value matrix pattern from patterns P1–P10 is read and stored in a memory control circuit 150.

A screen pattern memory circuit 118 is used to store a threshold pattern that corresponds to a plurality of supertiles and that covers region which has X+Y image elements (see FIG. 15 for X, Y) in the secondary scan direction, and which contains all the image elements in the primary scan direction (e.g. the number corresponding to the shorter side of a sheet of A3 paper). A line shifter 120 cyclically shifts the contents of a screen pattern memory circuit 118 by one line in the secondary scan direction each time a line sync signal is output.

A memory device 115 is pre-set with the S parameter by CPU 21. When L counter 111 outputs the L-image-elements period signal, a horizontal address calculating circuit 116 uses the S parameter stored in memory device 115 to calculate the (multiple) coordinates in the primary scan direction of the supertiles to which the next threshold value matrix patterns should be written.

A line sync generator 114 outputs a line sync signal, which serves as a synchronizing signal for the secondary scan direction. When a line sync signal is generated, a vertical address calculating circuit 117 uses the line sync signal to calculate the coordinates in the secondary scan direction of the plurality of supertiles to which the next threshold value matrix patterns should be written. These coordinates have the same values as those of the plurality of supertiles described above.

The coordinates for a plurality of supertiles are determined in this manner using the outputs from horizontal address calculating circuit 116 and vertical address calculating circuit 117. Memory control circuit 150 then takes the threshold value matrix pattern received previously from cell selecting circuit 113 and writes it to the super tiles.

When an image data comparison circuit 119 receives input image data and a threshold value corresponding to the input image data (the threshold value from the values stored in screen pattern memory circuit 118 corresponding to the coordinates of the input image data), the two values are compared. If the former is larger, image data comparison circuit 119 outputs a 255 (maximum value). Otherwise a 0 (minimum value) is output. This value is sent to printer 30 as output image data.

Figure 12:
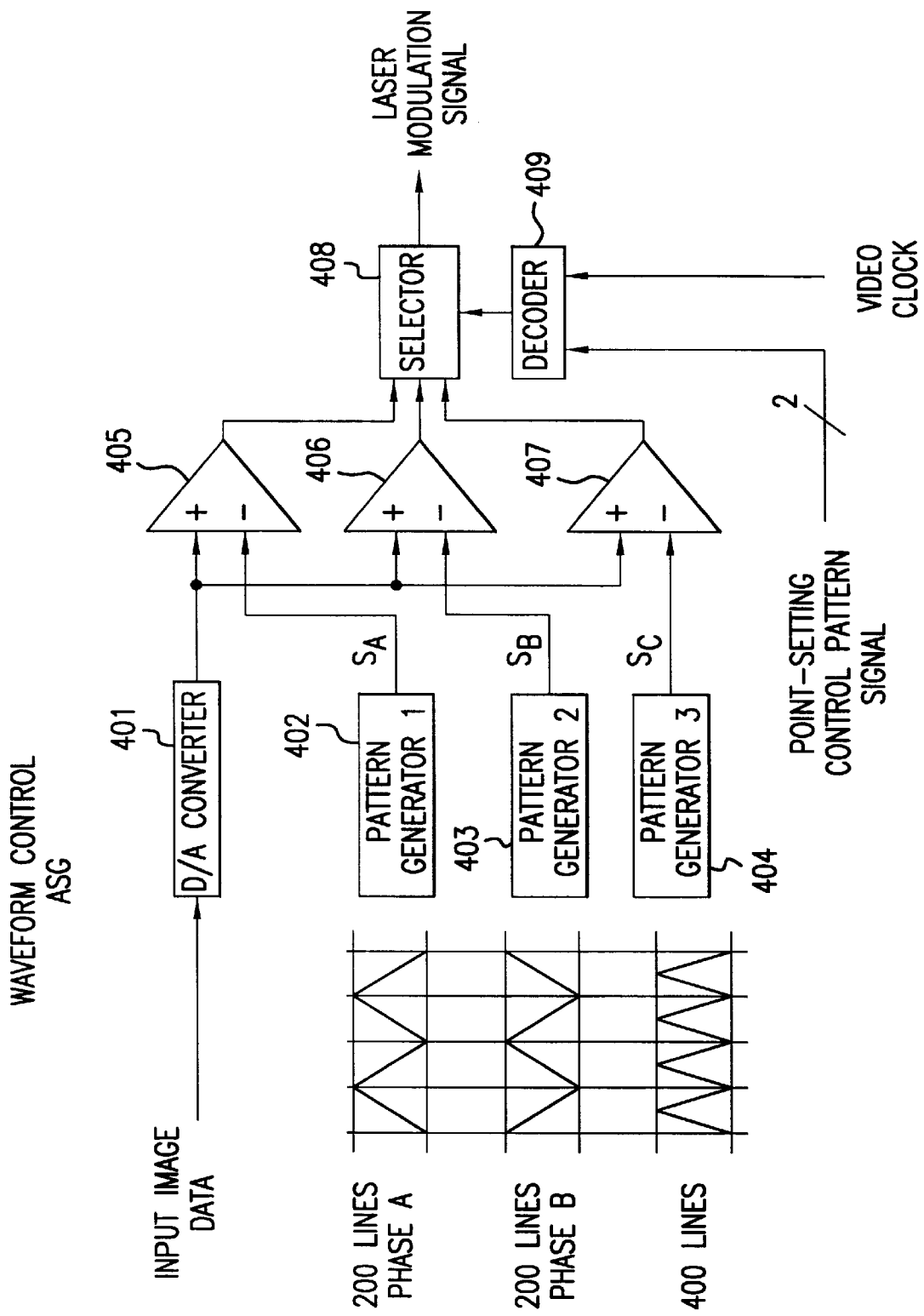
FIG. 12 illustrates a block diagram of waveform control ASG (analog screen generator) 31 in the first and the second illustrative embodiments of the invention.

FIG. 12 shows the structure of waveform control ASG 31 disposed in printer 30.

A D/A converter 401 takes input image data (the output image data from image data comparison circuit 119) and converts it to an output analog signal. Pattern generators 402, 403 generate triangular waves SA, SB, which have a frequency of 200 dpi and have a phase shift of 180 degrees relative to each other. A pattern generator 404 outputs a triangular signal SC, which has a frequency of 400 dpi.

Comparators 405, 406, and 407 compare the analog signal described above and triangular waveform signals SA, SB, and SC. If the analog signal has a level that is higher than those of triangular signal SA, SB, SC, then a 1 signal is output. Otherwise, a 0 signal is output. A decoder 409 generates a selection signal for selection between comparators 405, 406, and 407 based on a point-setting control pattern signal and in synchronization with a video clock VCLK.

The point-setting control signal is a signal that can have three values: 0, 1, or 2. This signal is used to specify a triangular waveform signal to be used in a comparison. A value of 0 specifies a 200 dpi triangular waveform signal in a decreasing state, a 1 specifies a 200 dpi triangular waveform signal in an increasing state, and a 2 specifies a 400 dpi triangular waveform signal SC. If the point-setting control pattern signal is 0 or 1, then the cumulative value of video clock VCLK (whether it is odd or even) is used to determine whether triangular waveform signal SA or SB will be used in the comparison.

However, in this embodiment, image processing circuit 24 does not output a point-setting control pattern signal. In this case, waveform control ASG 31 assumes that the point-setting control pattern signal is 0. A selector 408 uses this selection signal to select from comparator 405, 406, and 407, and outputs a laser modulated signal. Thus, in this embodiment, the comparison results from comparators 405, 406 are output one after the other.

1.2. Operation of First Illustrative Embodiment

The following is a description of the operation of the first illustrative embodiment. Personal computer 10 writes image data to image memory 25, and CPU 21 first sets the state of image processing circuit 24 to correspond to the yellow plane. If the screen angle for this plane is 0 degrees, then the threshold value matrix pattern stored in cell memory sections 100–109 will be a square pattern with no offset angle.

For example, if a yellow supertile is made up of 121 (11×11) image elements, then it can be approximated to the area of the supertile shown in FIG. 15 (130 image elements). In this example, the P parameter is 11 and the S parameter is 0. When these settings for yellow are complete, the image data from the Y plane is sent in sequence to image data comparison circuit 119.

One of the threshold patterns stored in cell memory sections 100–109 is written at random to screen pattern memory circuit 118. For each image element, image data comparison circuit 119 compares the level of the image data with the threshold value corresponding to the image element. Based on the results of this comparison, either a 0 or a 255 is output as image data.

Next, waveform control ASG 31 compares this image data with triangular waveform signal SA, and a laser modulated signal is output. In this embodiment, the image data is either 0 or 255, so a laser modulated signal is generated in which a simple on/off operation is performed for each image element. This causes image recording section 32 to output the contents of the yellow plane onto paper or the like.

Similar procedures are used to generate the cyan, black, and magenta images on paper or other output media. Of course, the threshold value matrix patterns written to cell memory sections 100–109, and the L, P, and S parameters vary according to the screen angle for each pattern.

Figure 7A:
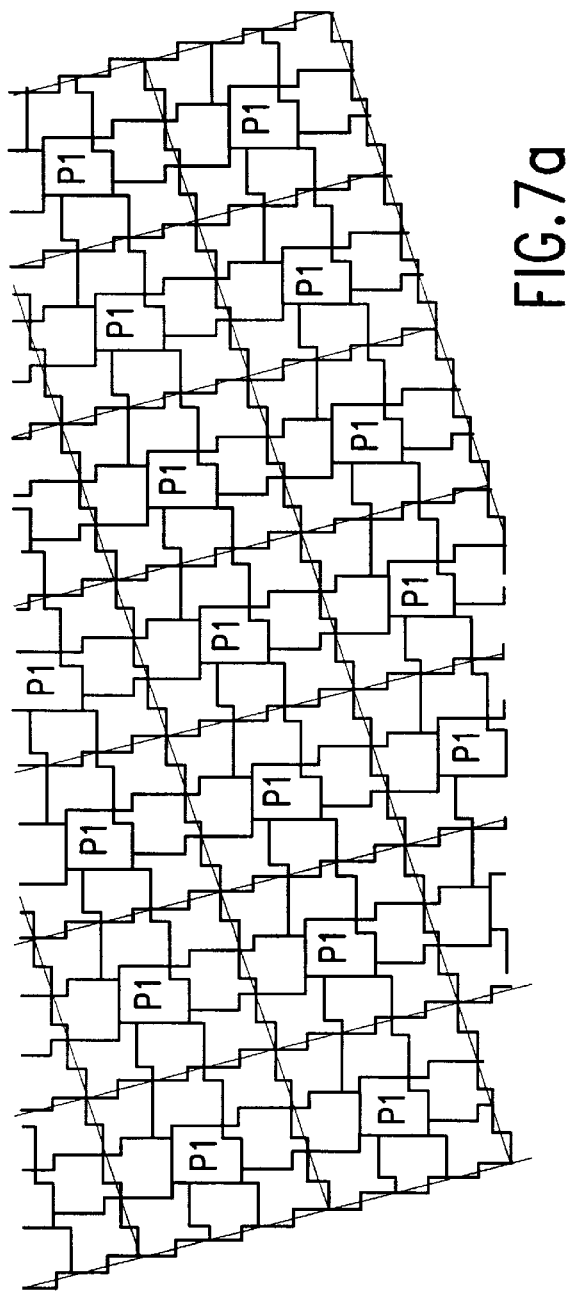
FIGS. 7(a) and 7(b) illustrate the operation of conventional image processing technology.
Figure 7B:
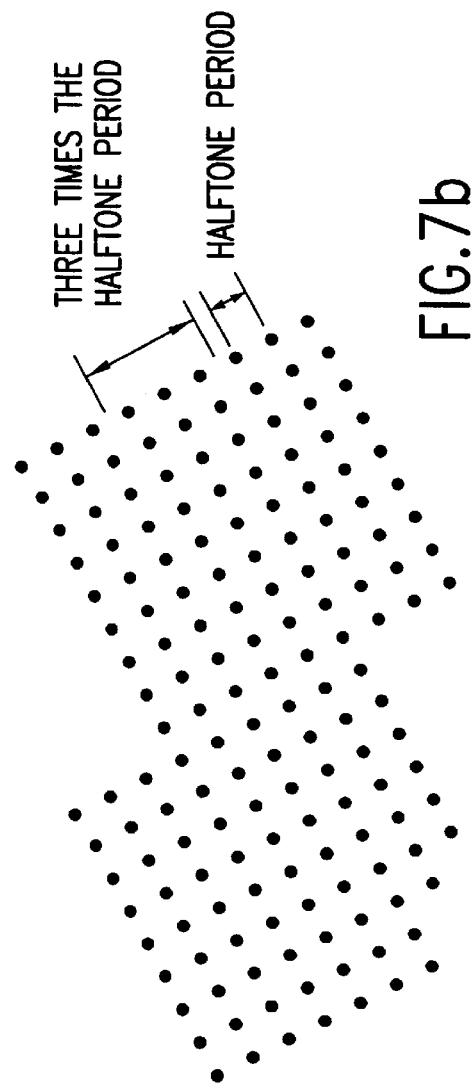
Figure 8A:
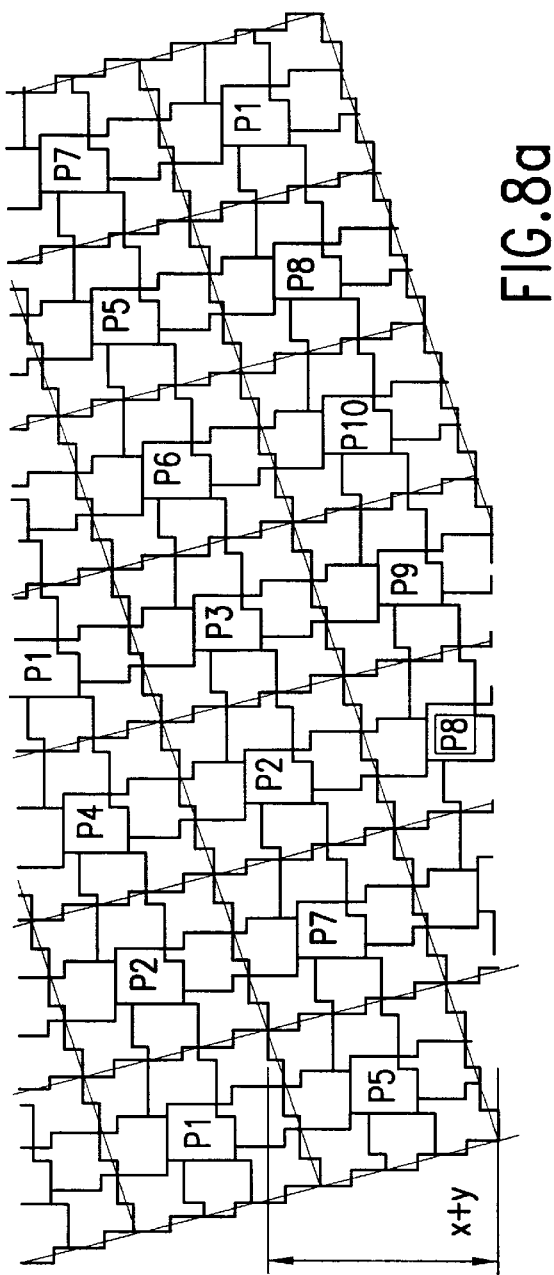
FIGS. 8(a) and 8(b) illustrate the operation of the first illustrative embodiment of the invention.
Figure 8B:
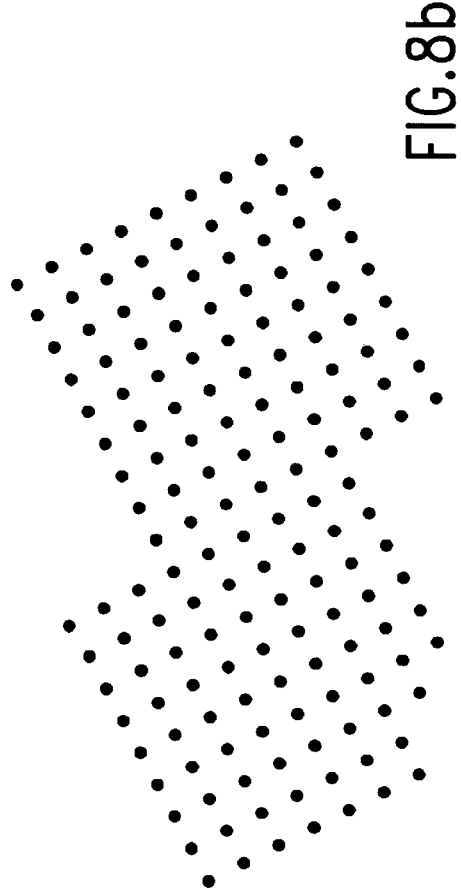
Figure 9:
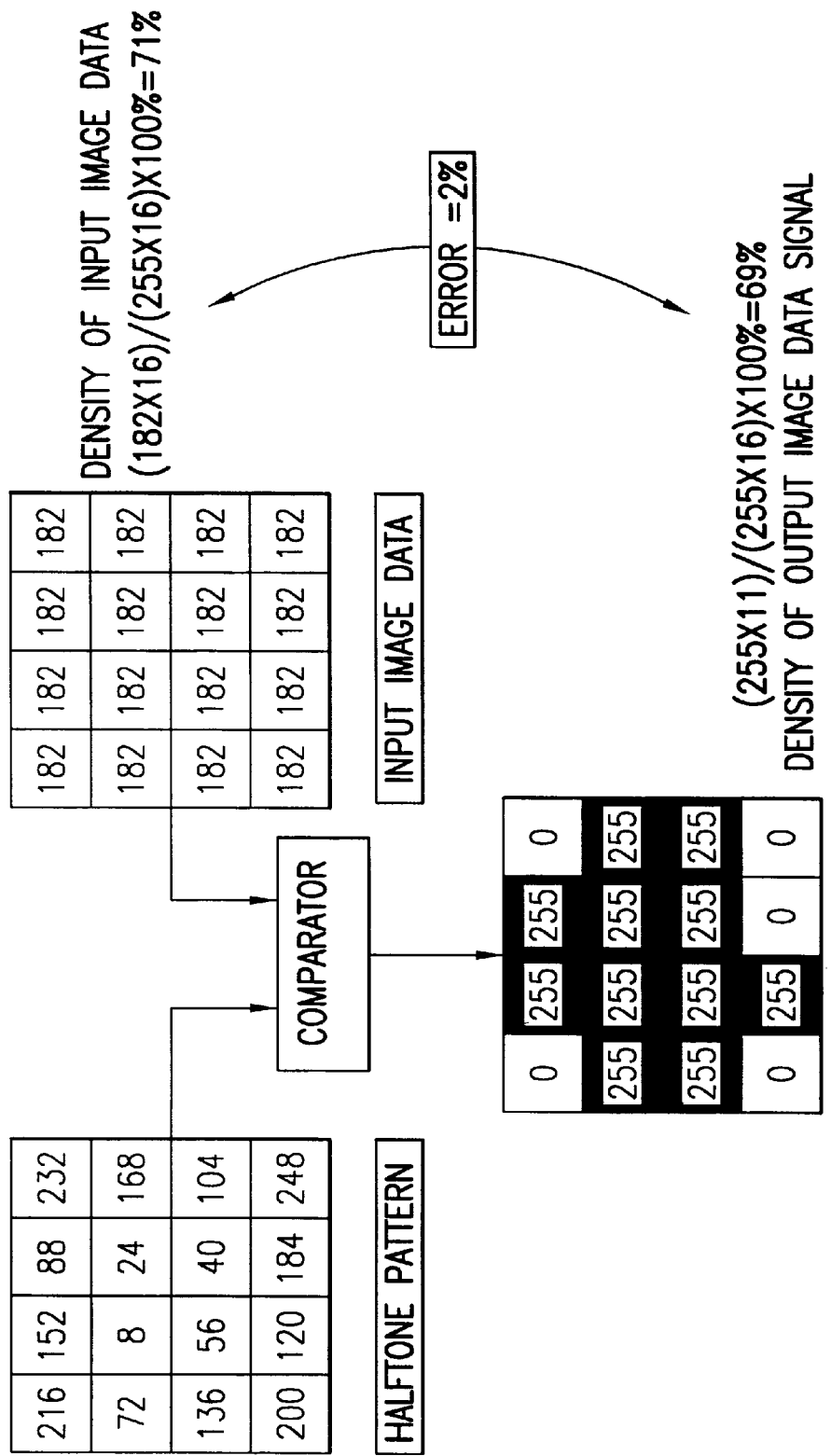
FIG. 9 illustrates the process of generating halftone cell screens in conventional technology and the first illustrative embodiment of the invention.

FIG. 8(*a*) shows the threshold value matrix patterns assigned to each supertile in the operation described above. The dot patterns generated using these threshold value matrix patterns are shown in FIG. 8(*b*). Comparing this dot pattern to the one in FIG. 7(*b*), it can be seen that the low-frequency periodic structure is eliminated in this embodiment. This is due to the random selection of threshold value matrix patterns.

2. Second Illustrative Embodiment 2.1. Summary of the Embodiment

In the first illustrative embodiment, described above, the threshold values stored in screen pattern memory circuit 118 and the input image data are compared, and the image element value for the output image data is obtained. However, the image element value of the output image data was either 0 or 255, thus decreasing the number of tone levels that can be reproduced. The second illustrative embodiment improves on this aspect.

Figure 10:
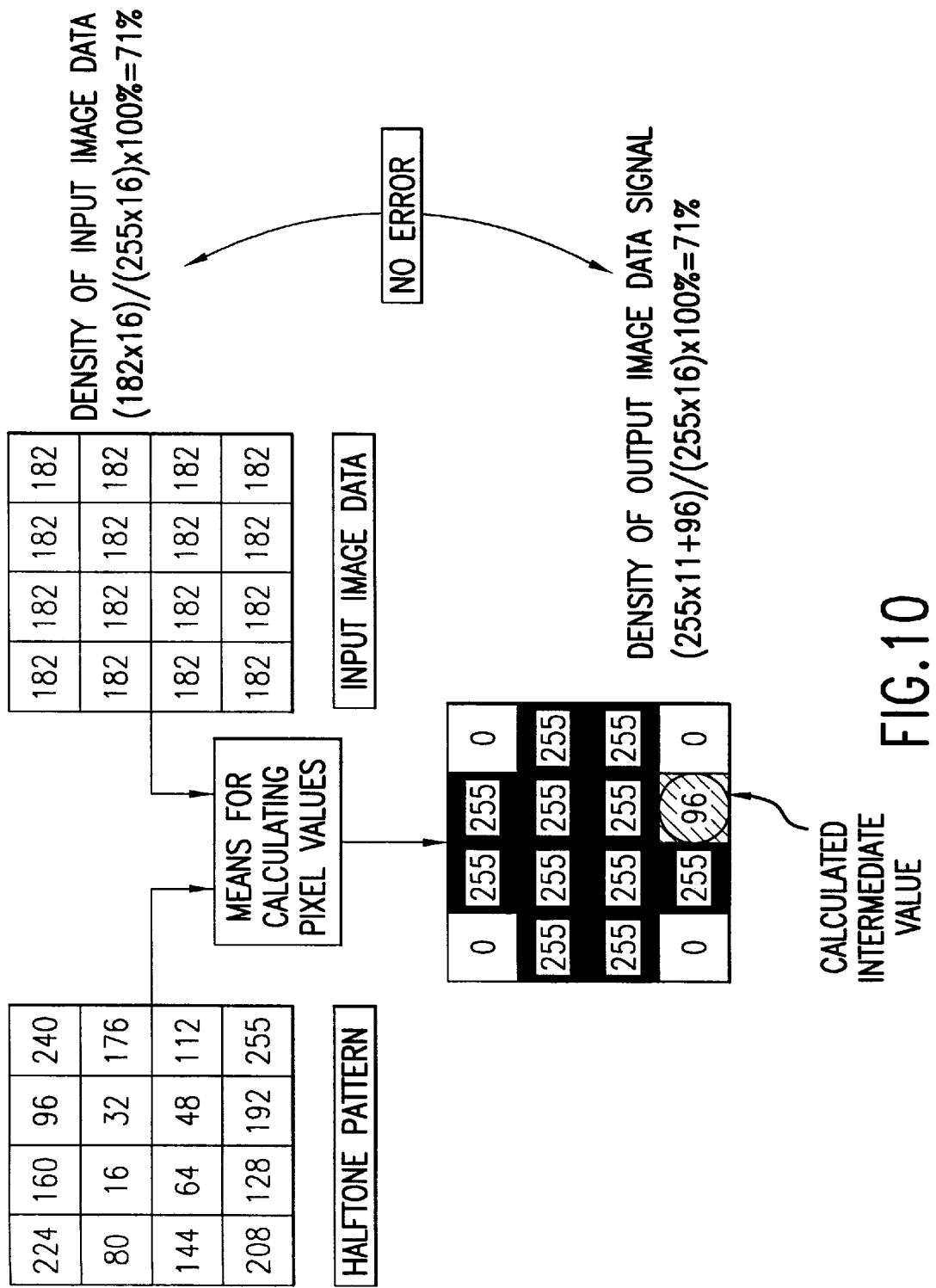
FIG. 10 illustrates the process of generating halftone cell screens in the second illustrative embodiment of the invention.

The second embodiment is described with reference to FIG. 10. A section adjacent to the lower right hand corner of the output image data in the drawing has an image element value of 96. When this image value is compared with triangular waveforms SA, SB, and a laser modulated signal is output, the laser modulated signal has a duty ratio corresponding to the image element value.

Figure 11:
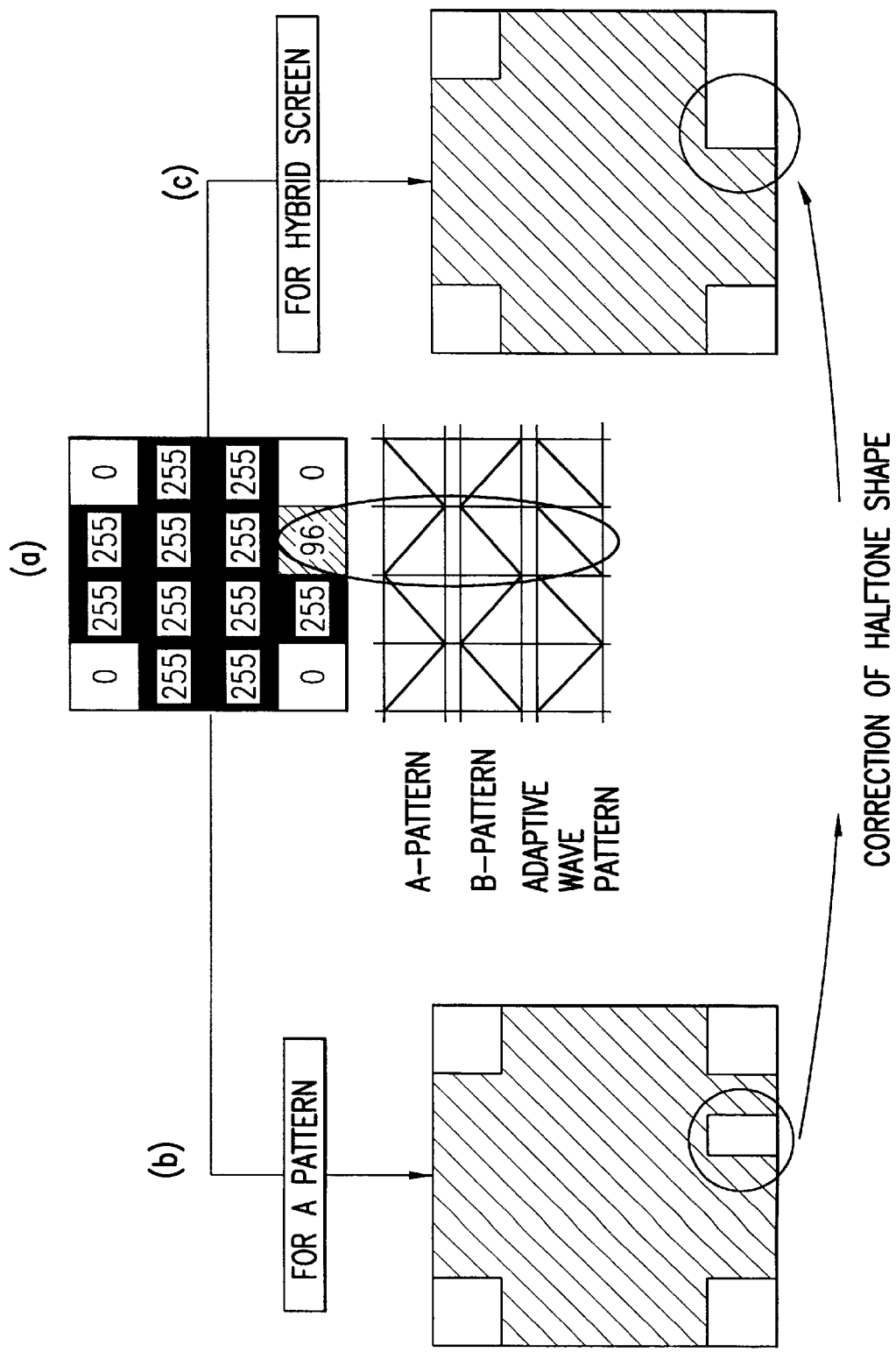
FIG. 11 illustrates the process of generating halftone cell screens in the second illustrative embodiment of the invention.

However, simply setting the duty ratio of the laser modulated signal will cause problems. If, based on the image data in FIG. 11(a), the laser modulated signal is modulated as shown in FIG. 11(b), the shape of the dot will not be suitable. Thus, it is necessary to select triangular waveform signal SA, SB so that a modulation pattern as shown in FIG. 11(c) can be obtained.

Figures 16A, 16B, 16C:
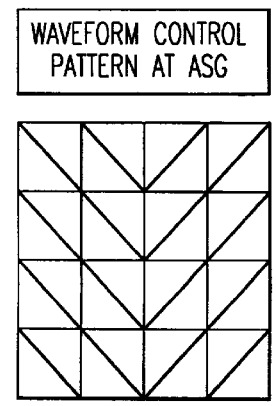
FIG. 16 illustrates the relationship between the threshold value matrix pattern and the waveform control pattern in a halftone cell in the second illustrative embodiment of the invention.
Figures 16D, 16E, 16F:
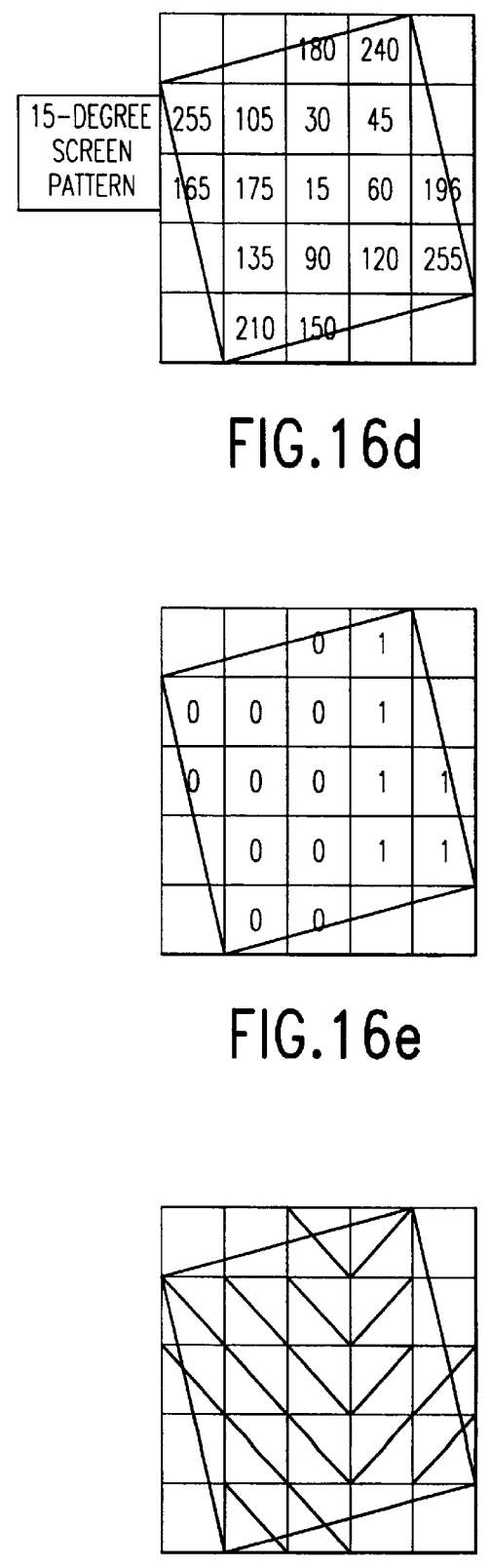

Whether a diminishing triangular waveform signal or an increasing triangular waveform signal should be used is stored for each image element that makes up a halftone cell. For example, starting from a threshold value matrix pattern in a halftone cell, as shown in FIG. 16(a), (d), a waveform threshold pattern as shown in FIG. 16(b), (e) is stored.

In this case, 0 indicates a diminishing triangular waveform signal, and 1 indicates an increasing triangular waveform signal. The waveforms of the triangular waveform signals assigned to these image elements is shown in FIG. 16(c), (f). If the waveform control pattern is 2, waveform signal SC is selected. However, waveform signal SC is included for output of detailed images such as maps, and is not used in the example shown in this drawing.

The patterns in the drawing show that when a low threshold value and a high threshold value are adjacent along the primary scan direction, the three waveform signals are selected so that the dots that would be output for the higher threshold values would be continuous with the dots that would be output for the lower threshold value. This prevents the dot shape from deteriorating.

2.2 Structure of Second Illustrative Embodiment

Figure 6:
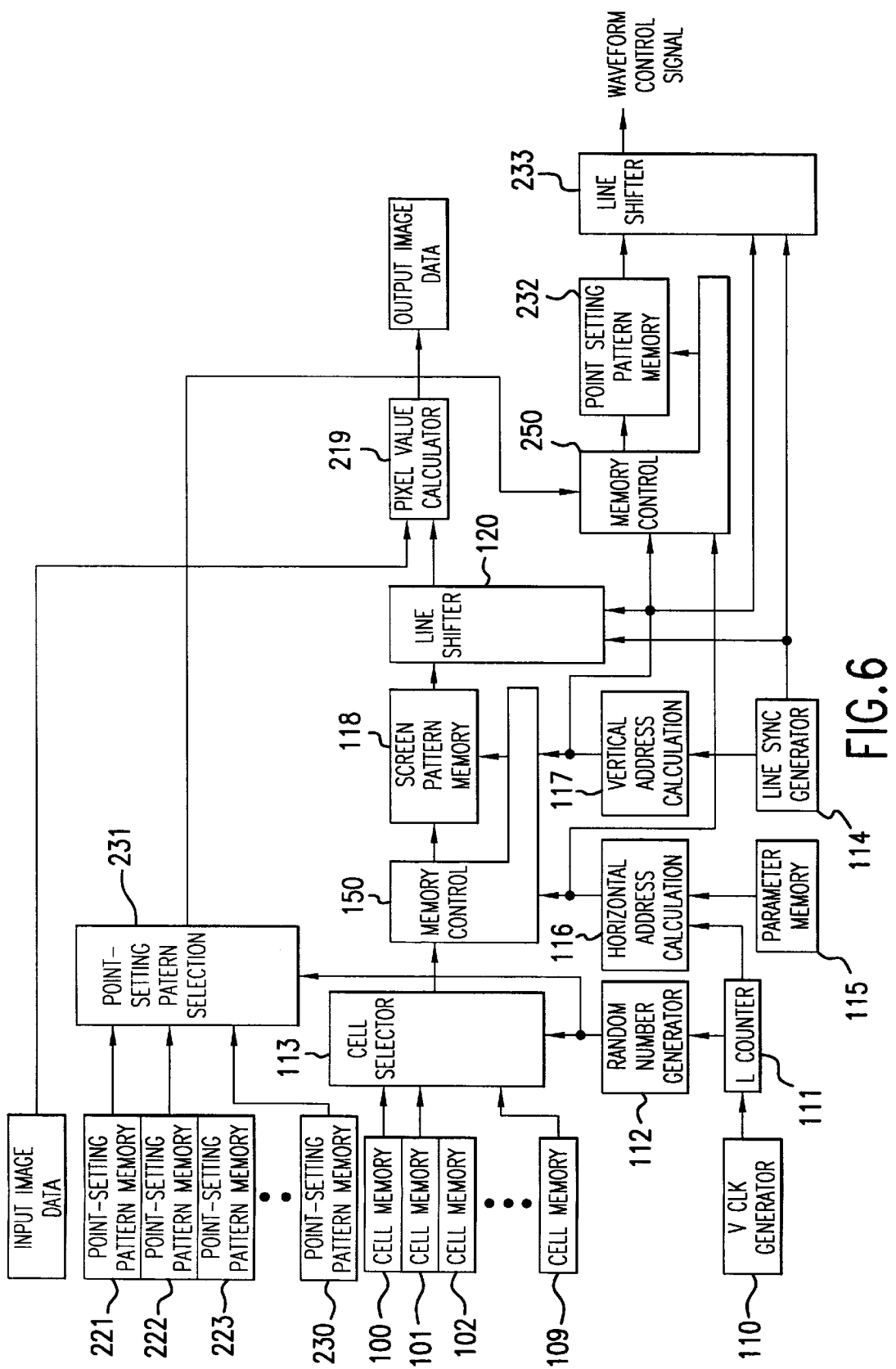
FIG. 6 illustrates a block diagram of the image processing circuit in a second illustrative embodiment of the invention.

The following is a description of the structure of the second illustrative embodiment, which implements the concepts described above. The overall structure of this embodiment is similar to that of the first illustrative embodiment (FIG. 13), but instead of image processing circuit 24, includes an image processing circuit as shown in FIG. 6. In FIG. 6, like parts are identified by like numerals and their descriptions are omitted.

Point-setting pattern memory sections 221–230 store point-setting patterns (waveform control patterns) corresponding to the threshold value matrix patterns stored in cell memory sections 200–209. A point-setting pattern selection circuit 231 uses a cell selection signal output from random number generator 112 to select one of the point-setting patterns stored in point-setting pattern memory section 221–230.

Figure 14:
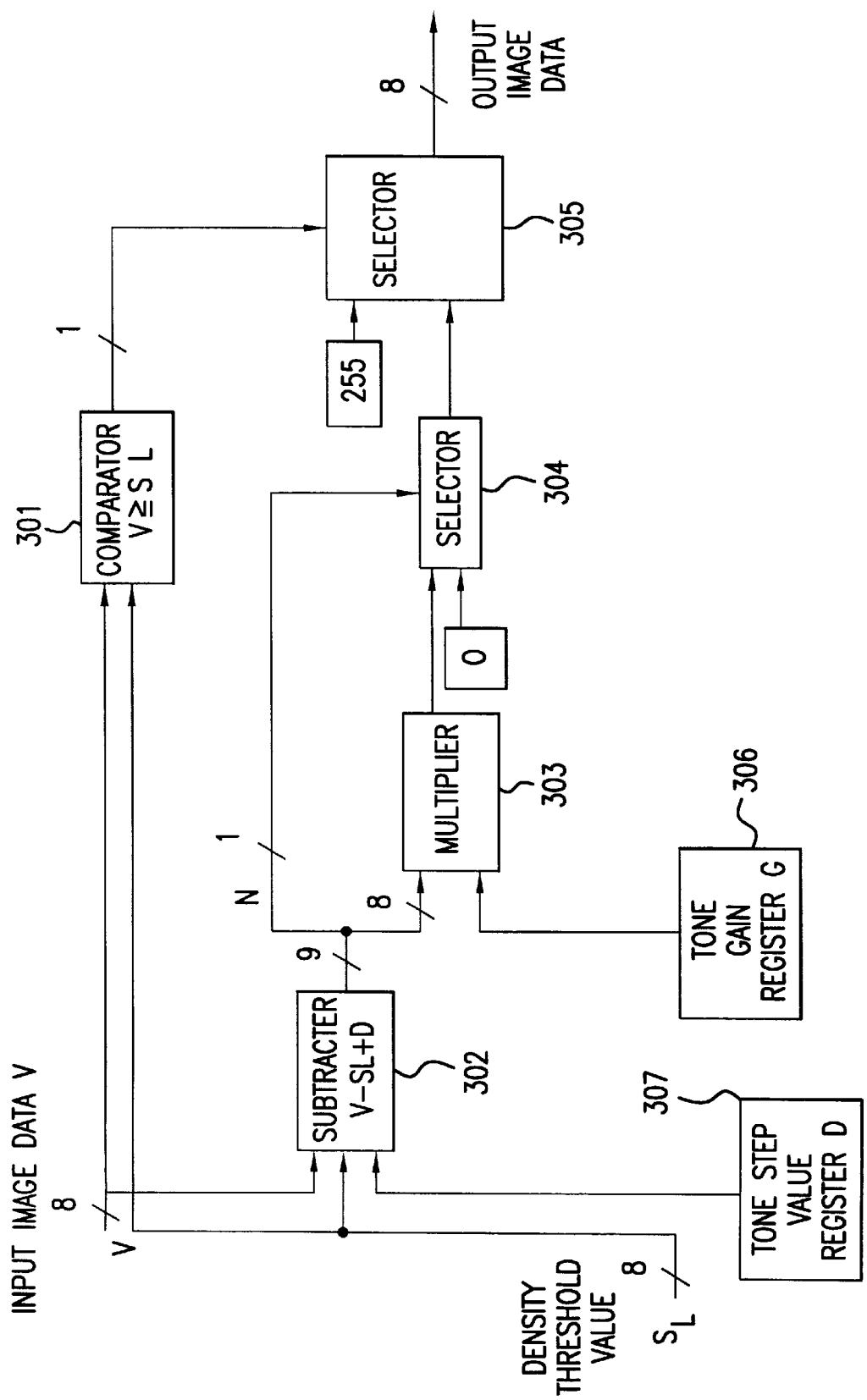
FIG. 14 illustrates a block diagram showing pixel value calculation circuit 219 in the second illustrative embodiment of the invention.

The following is a description of the structure of a pixel value calculation circuit 219 shown in FIG. 14.

A comparator 301 compares an input image signal (pixel density) V and a density threshold SL. A tone step value register 307 stores a prescribed tone step value D.

This tone step value D is set to the tone count of input image signal V divided by the number of image elements within a halftone cell (the units column is rounded). In the example above, the tone count was 256. Thus, if the halftone cell from FIG. 16(a), with 16 image elements, were used, tone step value D would be 16 (256/16).

A subtracter 302 uses equation (3) below to calculate a value N for input image signal V, density threshold value SL, and tone step value D.

Equation (3)

$$N = V - SL + D$$

A tone gain register 306 stores a tone gain G. Tone gain G is set so that it is equal to the number of image elements in the halftone cell being processed (16, in the example above). A multiplier 303 multiples tone gain G and value N and outputs the results of the operation. A selector 304 checks the sign bit of value N. If value N has a negative value, a 0 is output. Otherwise, the result of the multiplication operation is output. A selector 305 outputs a value of 255 if the result of the comparison performed by comparator 301 was V>=SL. Otherwise, the output value from selector 304 is output.

The following description covers an example in which input image signal V has a value of 182, and the values shown in FIG. 16(a) are output from line shifter 120. When input image signal V is 182, the relationship V>=SL is established for density threshold values SL of 16,32,... 176. Therefore, for these values of density threshold value SL, an image density signal OD of 255 (maximum density) is output. If density threshold SL is 192, 208, ..., 255, then the relationship V<SL is established, and selector 304 outputs the output image data.

When density threshold value SL is 208, ..., 255, value N from Equation (3) is negative. Therefore, an output image data value of 0 (minimum density) would be output via selectors 304, 305. Thus, when density threshold value SL is a value other than 192, the output image data is either 255 (maximum density) or 0 (minimum density), and the same results as in the first illustrative embodiment are output. However, in this embodiment, when density threshold value SL has a value of 192, the output image data is different.

When density threshold value SL is 192, value N from Equation (3) is 6 (=182−192+16), and the multiplication result from multiplier 303 is 96 (=6×16). This product goes through selectors 304, 305, and is output as output image data. Thus, for sub-pixels having a density threshold value SL of 192, the output image data is set to an intermediate density.

As described above, this output image data is compared with triangular waveform signals SA, SB, and laser modulated signal based on the result is output. Thus, if the output image data has an intermediate density, this determines the area of the portion of the image element that corresponds to the ON state.

Returning to FIG. 6, there is shown memory control circuit 250, a point-setting pattern memory circuit 232, and a line shifter 233. These elements are structured in the same manner as memory control circuit 150, screen pattern memory circuit 118, and line shifter 120, respectively. However, while screen pattern memory circuit 118 stores threshold values corresponding to each image element, point-setting pattern memory circuit 232 stores point-setting patterns (0–2) corresponding to each image element.

2.3 Operation of the Second Illustrative Embodiment

When image data is written to image memory 25, CPU 21 sets the image processing circuit (FIG. 6) according to the color plane. For each setting, output image data is output from pixel value calculation circuit 219 in synchronization with video clock VCLK.

As described above, the output image data in this embodiment is not limited to 0 and 255, but also includes intermediate density data. Point-setting patterns, i.e. waveform control signals, are output via line shifter 233 in synchronization with the output image data. Thus, waveform control ASG 31 outputs a laser modulated signal so that the image in the primary scan direction is continuous.

This embodiment has, in addition to the advantages of the first embodiment, the following significant advantages.

First, according to the second illustrative embodiment, if an image elements fulfills the condition input image data V<density threshold value SL and also the condition value N (N=V−SL+D) is not negative, the image element is set to an intermediate density corresponding to value N. This provides an adequate number of reproducible tones while maintaining a high line count.

Thus, in this embodiment, density threshold value SL is used not only as a threshold value but also for determining an intermediate density. The term "threshold value" generally refers to the former usage, while the phrase "growth-weight value" refers mainly to the latter usage. In the latter usage, growth-weight value matrix patterns are stored in cell memory sections 100–109.

Second, according to this embodiment, when there is a first image element having an intermediate density and a second image element that is adjacent to the first image element with a density threshold value that is lower than the first image element, a triangular waveform signal is selected so that the ON-state portions of the first and second image elements are continuous. This prevents the screen shape from deteriorating, and provides stable and high-quality output images.

3. Third Illustrative Embodiment

In the first and second illustrative embodiments, various circuits were used to control screen pattern memory circuit 118. However, it is also possible to control screen pattern memory circuit 118 using circuits other than those described in these embodiments. The following is a description of third and fourth illustrative embodiments of the present invention, in which different circuits are used in the first and second illustrative embodiments.

Figure 20:
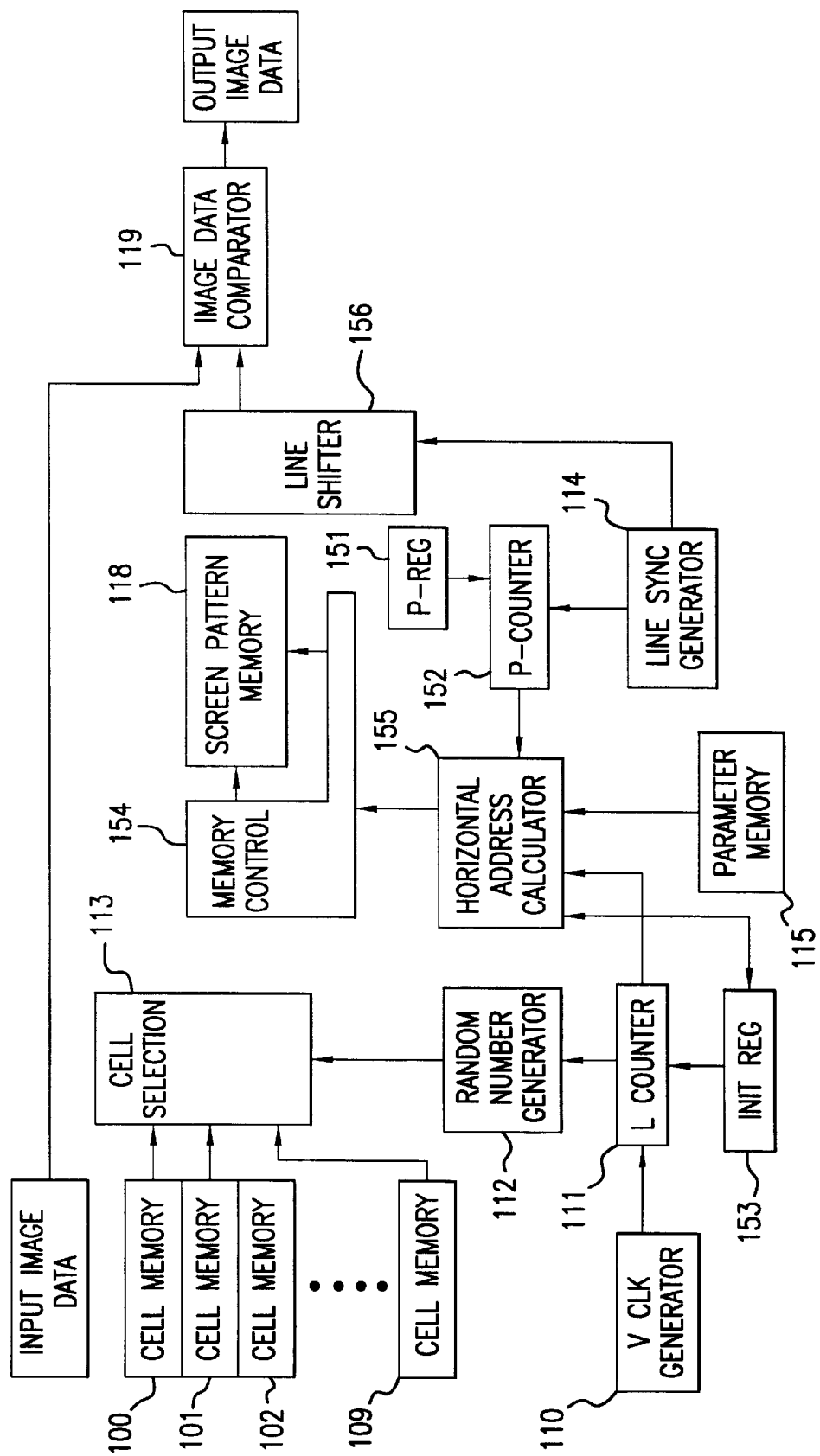
FIG. 20 illustrates a block diagram of the image processing circuit in the third illustrative embodiment of the invention.

The structure of the third illustrative embodiment is similar to that of the first (FIG. 13), but instead of image processing circuit 24, includes an image processing circuit as shown in FIG. 20. In FIG. 20, like parts as in FIG. 5 are given like numerals, and their descriptions are omitted.

A P parameter register 151 stores the P parameter. A P counter 152 outputs a P line period signal each time the line sync signal has been generated P times. An initial address register 153 stores the initial value of the coordinate in the primary scan direction of the supertile (details to be described later). A memory control circuit 154, similar to memory control circuit 150 from the first embodiment, stores a threshold value matrix pattern selected by cell selection circuit 113 from threshold value matrix patterns P1–P10, and this threshold value matrix pattern is written to screen pattern memory circuit 118.

A horizontal address calculation circuit 155 calculates the coordinate of screen pattern memory circuit 118 along the primary scan direction based on the following factors: the P line period signal output from P counter 152; the S parameter stored in memory device 115; the L-image-elements period signal output from L counter 111; and the initial value stored in initial address register 153. Each time a line sync signal is generated, a line shifter 156 cyclically shifts the contents of screen pattern memory circuit 118 in the secondary scan direction one line at a time.

When L counter 111 receives a video clock VCLK, L counter 111 generates an L-image-elements period signal every L period. As in the first illustrative embodiment, one of the threshold value matrix patterns from cell memory sections 100–109 is written to memory control circuit 154 via cell selection circuit 113. For each line, horizontal address calculation circuit 155 calculates the address along the primary scan direction at which to store the representative address of the selected threshold value matrix pattern (a prescribed image element positioned at the uppermost level of the pattern). This address is sent to memory control circuit 154.

The selected threshold value matrix pattern is then written to screen pattern memory circuit 118. At this point, if the L, P, and S parameters are 17, 1, and 4, respectively, and the initial address stored in initial address register 153 is 3, then the selected threshold value matrix pattern would be written to the region indicated by the hatch marks in FIG. 25(a).

The initial address indicates the representative address of the threshold value matrix pattern to be written to the leftmost position in the drawing (the address of the image element marked with a circle). Once the representative address is determined, the addresses for the other image elements are uniquely determined based on the shape of the threshold value matrix pattern. The addresses of the other sections of the threshold value matrix pattern are equal to the results of adding the address of the leftmost position to an integer multiple of the L parameter.

Once the threshold value matrix pattern is written to screen pattern memory circuit 118, line shifter 156 reads the contents of the uppermost level and sends the results to image data comparison circuit 119. As in the first embodiment, this results in input image signal V being compared to density threshold SL for each video clock VCLK.

While this operation is taking place, line shifter 156 takes the content of screen pattern memory circuit 118 and shifts it by one line in the secondary scan direction. Then, as in the case described above, the contents of the uppermost level is compared with the image data. This series of operations is repeated P times (once in the example shown in the drawing). FIG. 25(b) shows the situation after shifting is performed P times. Next, the S parameter is subtracted from the initial address, and the resulting new address is saved in initial address register 153. However, if the result of the subtraction is negative, the new initial address becomes the sum of the result and the L parameter.

Figure 25A:
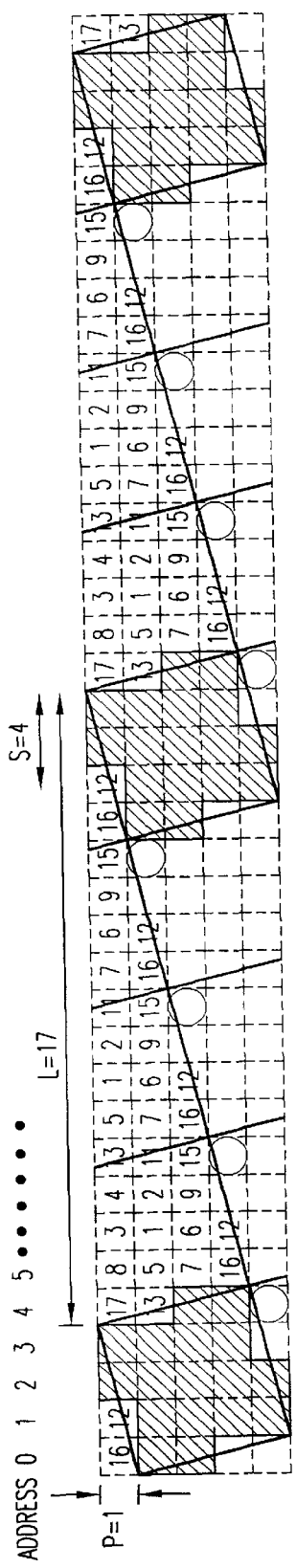
FIGS. 25(a) and 25(b) and 25(e) illustrate the operation of the third and fourth illustrative embodiments of the invention.
Figure 25B:
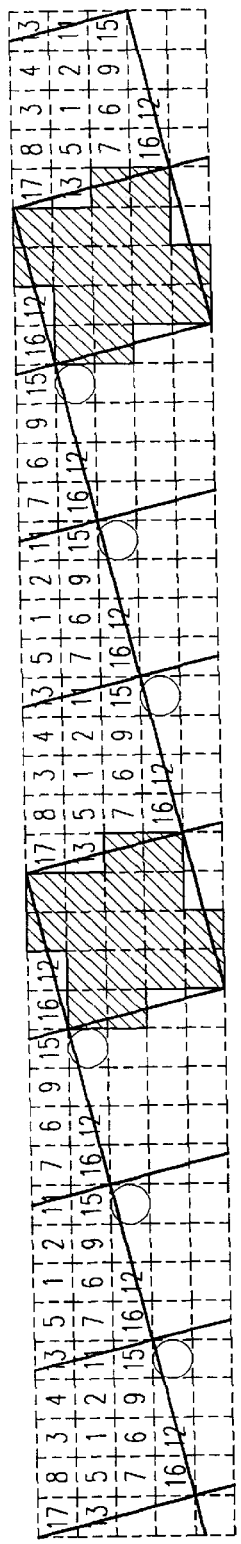

In the example in FIG. 25(a), the initial address is 3. Thus, a new initial address of 3−4+17=16 is written to initial address register 153. As a result, the representative addresses for the threshold value matrix patterns to be written to screen pattern memory circuit 118 are subsequently 16, 33, 50, . . . , and the threshold value matrix patterns are written to the hatched sections in FIG. 25(b).

Figure 25C:
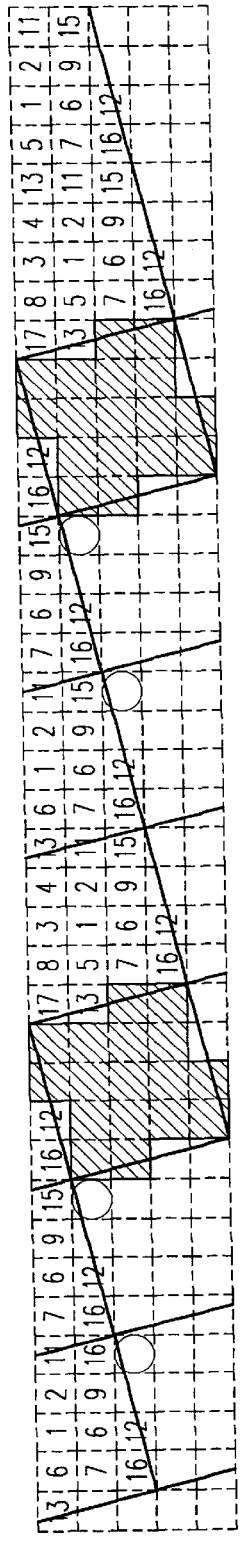

Then, line shifter 156 reads the contents of the uppermost level in FIG. 25(b), and sends the results to image data comparison circuit 119. In parallel with this operation, line shifter 156 shifts the contents of screen pattern memory circuit 118 by one line again in the secondary scan direction. Then, as in the case described above, the contents of the uppermost level are sent to image data comparison circuit 119. This series of operations is repeated P times (once in the example shown in the drawing). FIG. 25(c) shows the situation after the operations are performed P times. Then, the S parameter 4 is subtracted from the current initial address 16, and the result 12 is stored in initial address register 153 as the new initial address. As a result, the new threshold value matrix patterns are written to the hatched sections shown in FIG. 25(c).

4. Fourth Illustrative Embodiment

Figure 21:
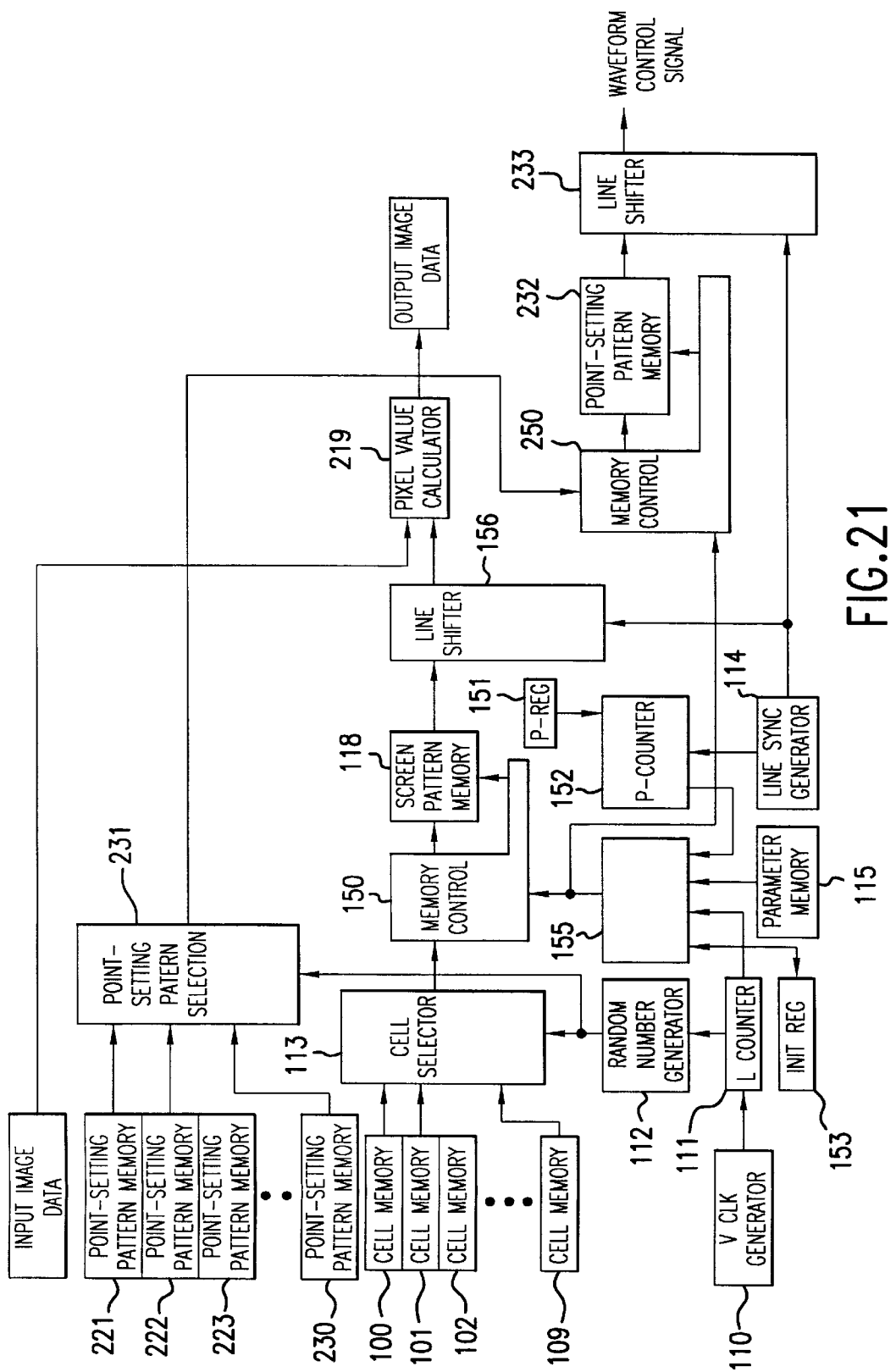
FIG. 21 illustrates a block diagram of the image processing circuit in the fourth illustrative embodiment of the invention.

The following is a description of a fourth illustrative embodiment. The structure of the fourth illustrative embodiment is similar to that of the second, but instead of the image processing circuit shown in FIG. 6, contains the circuit shown in FIG. 21.

Instead of horizontal address calculation circuit 116, a horizontal address calculation circuit 155 and an initial address register 153 are disposed. Instead of vertical address calculation circuit 117, a P parameter register 151 and a P counter 152 are provided. Instead of line shifter 120 a line shifter 156 is provided. Thus, the overall operation of this embodiment is similar to that of the second illustrative embodiment, and the control operations for screen pattern memory circuit 118 are similar to those of the third illustrative embodiment.

5. Other Embodiments

The invention is not restricted to the examples described above. For example, the following alternative embodiments are also possible.

In the illustrative embodiments described above, 200 dpi or 400 dpi triangular waveform signals SA, SB, SC were selected based on the point-setting control pattern signal. However, the line counts for triangular waveform signals SA, SB, SC are not as restricted to those described above. Other line counts, such as 300 dpi and 600 dpi can be used as well.

In the illustrative embodiments described above, the input image data (the output image data from image data comparison circuit 119) is converted into an analog signal via D/A converter 401, and this is then compared with triangular waveform signals SA, SB, SC via comparators 405, 406, and 407 to provide a laser modulated signal. The method for obtaining laser modulated signals in this manner is known as "analog screening".

Figure 22:
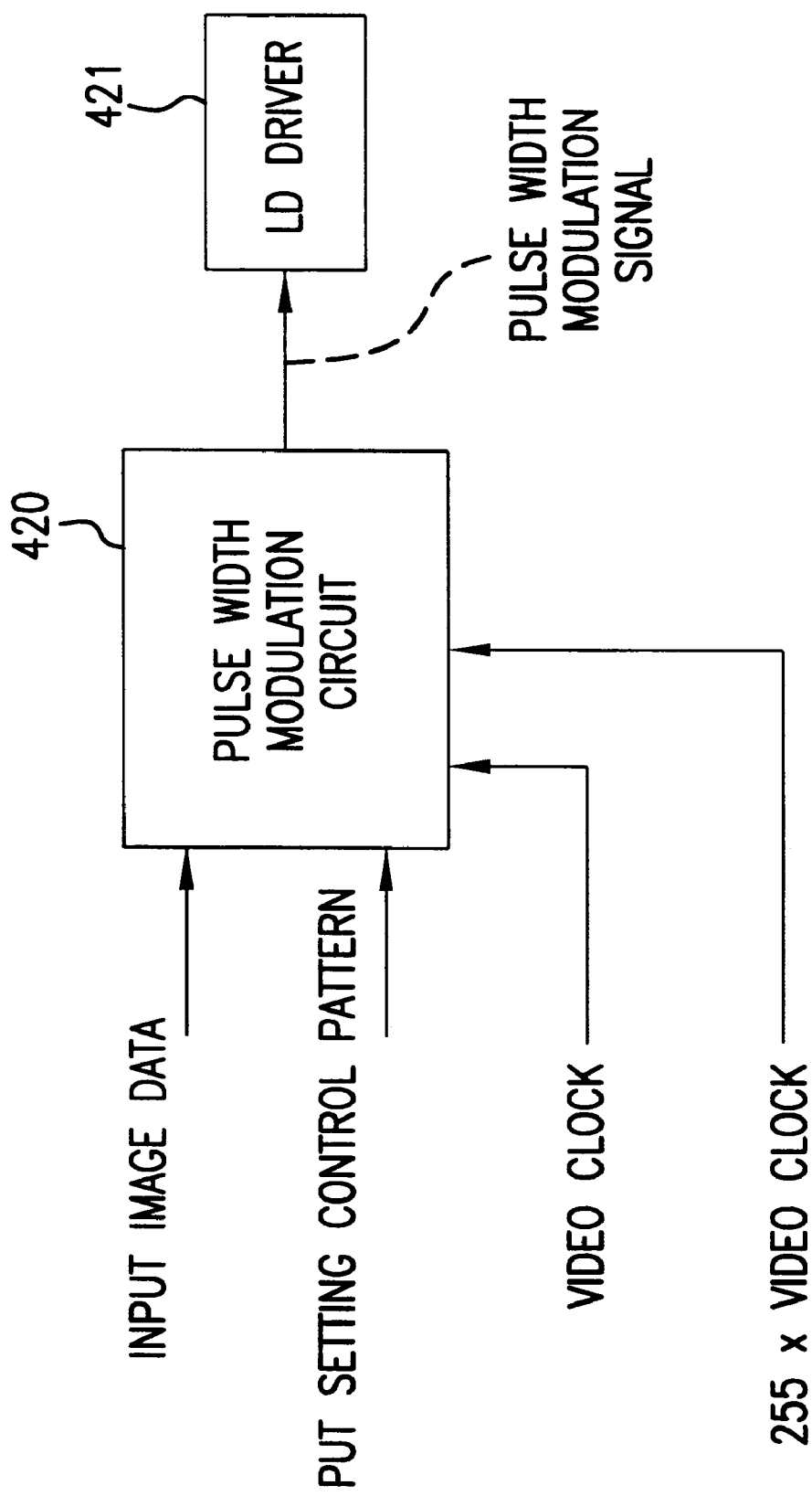
FIG. 22 illustrates a circuit diagram of an alternative example of the waveform control ASG.

In the illustrative embodiments described above, waveform control ASG 31, analog screening is implemented in waveform control ASG 31. However, it is also possible to use a circuit in which "digital screening" is implemented. Referring to FIG. 22, the following is a description of this method. In the drawing, a pulse width modulation circuit 420 determines a growth starting point and an output width based on the input image data (digital values) and the point-setting control pattern signal.

The output width referred to here is the number of clock periods, where one clock period is video clock VCLK multiplied by 255. When the input image data is expressed in 255 tones, the value of the input image data can be used directly as the output width. The growth starting point is 255—the output width when the point-setting control pattern signal is 0, and is 0 when the point-setting control pattern signal is 1.

Figure 23:
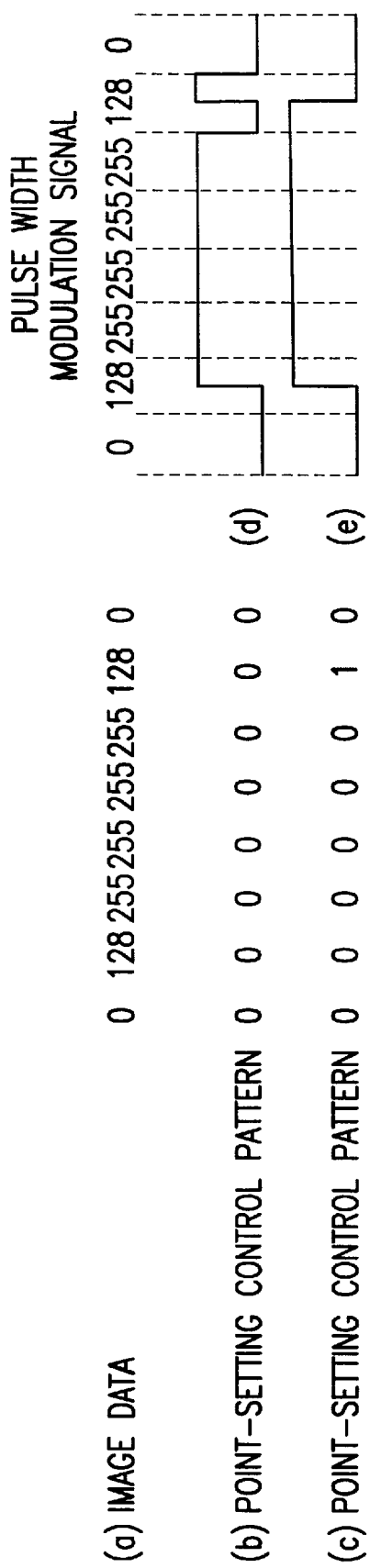
FIG. 23 illustrates a drawing for the purpose of describing the operation of the circuit in FIG. 22.

Pulse width modulation circuit 420 starts up at the growth starting point, and outputs a pulse-width modulation signal that stays at the 1 level for an interval corresponding to the output width. If the input image data is as shown in FIG. 23(a), then the pulse-width modulation signal would be as shown in FIG. 23(d) and (e) for point-setting pattern control signal as shown in FIG. 23(b) and (c).

These pulse width modulation signals have similar waveforms as the laser modulated signals output from selector 408 in the embodiments described above. The pulse width modulation signals are sent to a laser diode driver 421 to generate a density modulation signal that modulates a laser.

In the example shown in FIG. 22, video clock VCLK is multiplied by 255 to serve as the clock. However, the multiple of video clock VCLK can correspond to the size (number of image elements) of the threshold value matrix.

Figure 24:
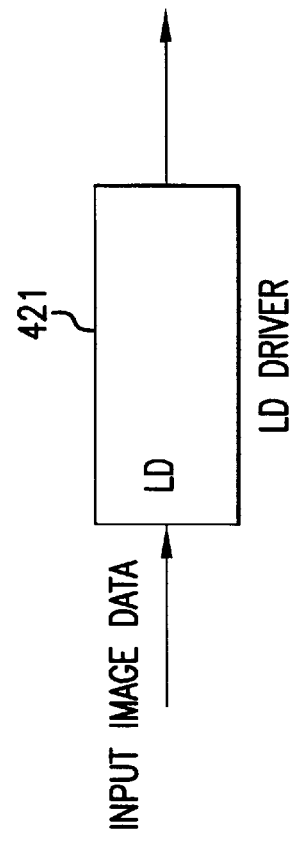
FIG. 24 illustrates a circuit diagram of an alternative example of the waveform control ASG.

It would also be possible to not use waveform control ASG 31, and, as shown in FIG. 24, to send the input image data directly to laser diode driver 421. In other words, the input image data itself would serve as the control signal for laser output power. In this case as well, it would be possible to have the tone count of the laser output power correspond to the size (number of image elements) of the threshold value matrix pattern. Also, to guarantee the linearity between the laser output power and the output image density, it would also be possible to use a look-up table at a stage preceding laser diode driver 421.

In the illustrative embodiments described above, the threshold value matrix pattern to be written to screen pattern memory circuit 118 is selected from the ten threshold value matrix patterns stored in cell memory sections 100–109. However, the number of available threshold value matrix patterns is not, of course, restricted to ten. The same applies to the second illustrative embodiment.

In the illustrative embodiments described above, a random number generated by random number generator 112 is used to select a threshold value matrix pattern out of a plurality of patterns. However, the method for generating random numbers is not restricted to the use of random number generator 112. For example, a random number table can be set up so that a threshold value matrix pattern can be selected by referring to this random number table.

Furthermore, the threshold value matrix pattern does not need to be selected randomly, and can instead be selected according to a prescribed sequence. For example, threshold value matrix patterns can be selected cyclically, or a reference table indicating a sequence for selection can be set up, and threshold value matrix patterns can be selected based on the contents of this reference table. In these cases, there is some possibility that low-frequency periodic structures may be generated in the output image. However, compared to conventional technology, the image quality will be significantly improved.

Also, in the illustrative embodiments described above, the supertiles are formed roughly as squares. However, the supertiles can also be rectangles or the like. Different shapes can be used as long as a plurality of supertiles can be disposed without creating gaps.

In the illustrative embodiments described above, the threshold value matrix patterns stored in cell memory sections 100–109 are written directly to screen pattern memory circuit 118. However, it would also be possible to have screen pattern memory circuit 118 only store data relating to which threshold value matrix pattern from P1–P10 will be used for an image element, and to have the actual threshold values read directly from cell memory sections 100–109.

Figure 17:
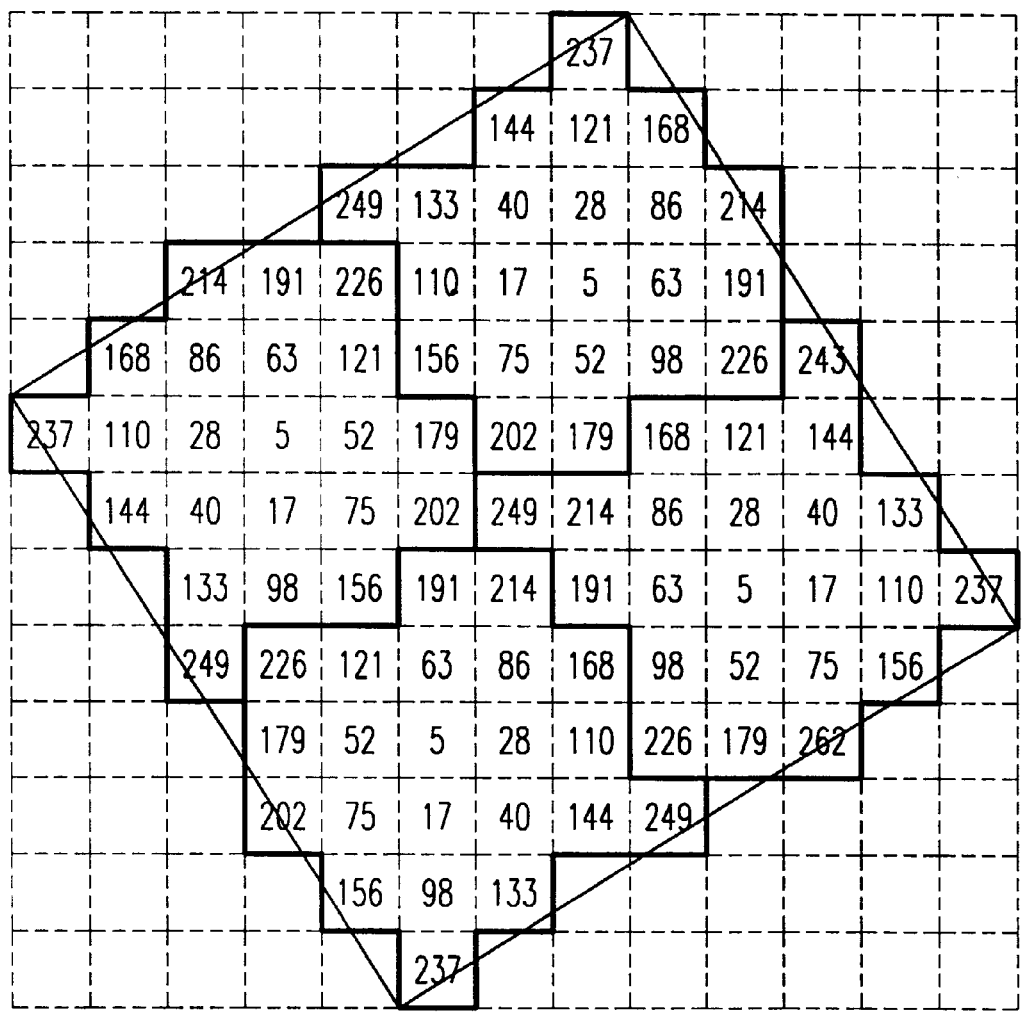
FIG. 17 illustrates the operation of an alternative example of the second illustrative embodiment of the invention.
Figure 18:
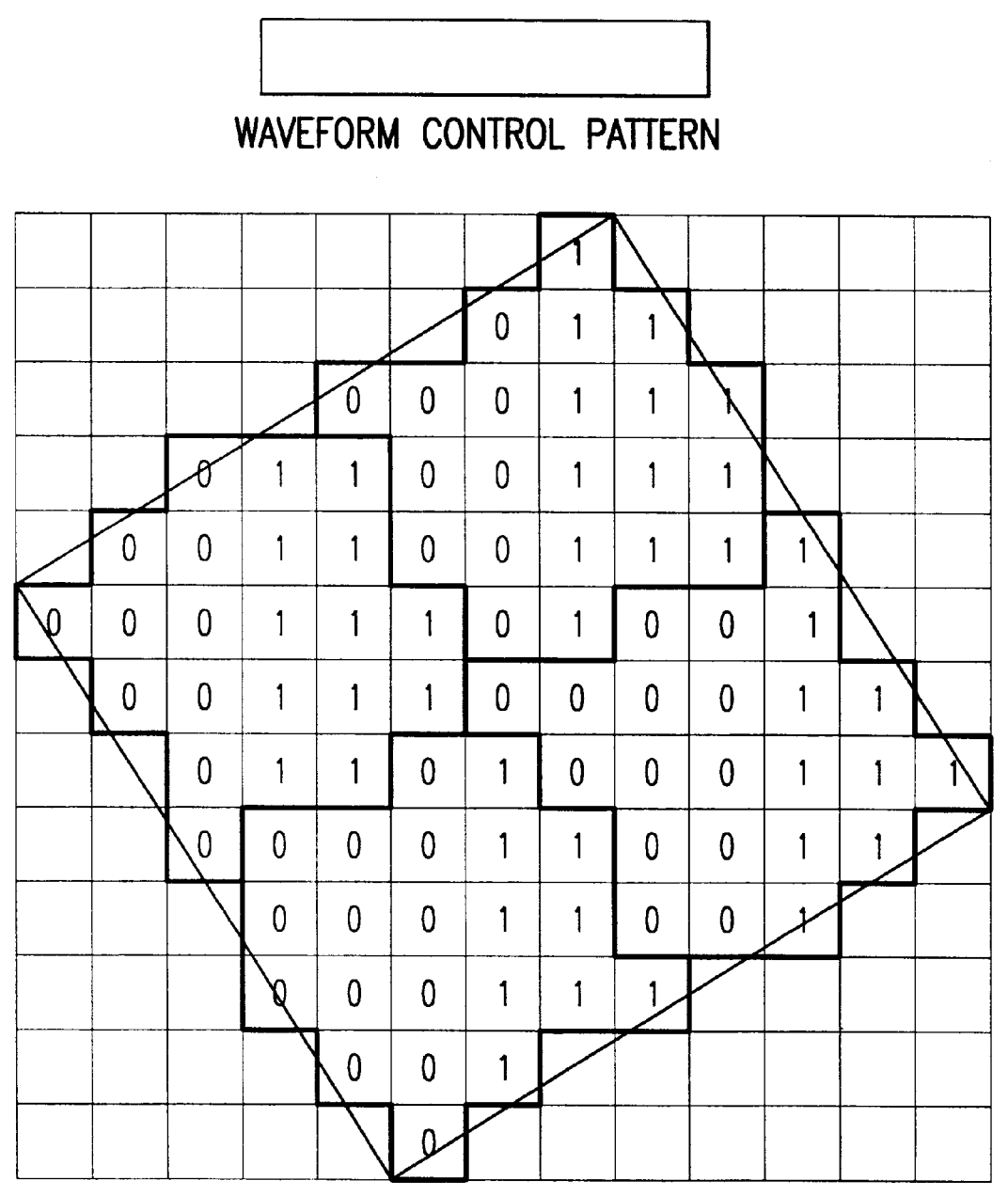
Figure 19:
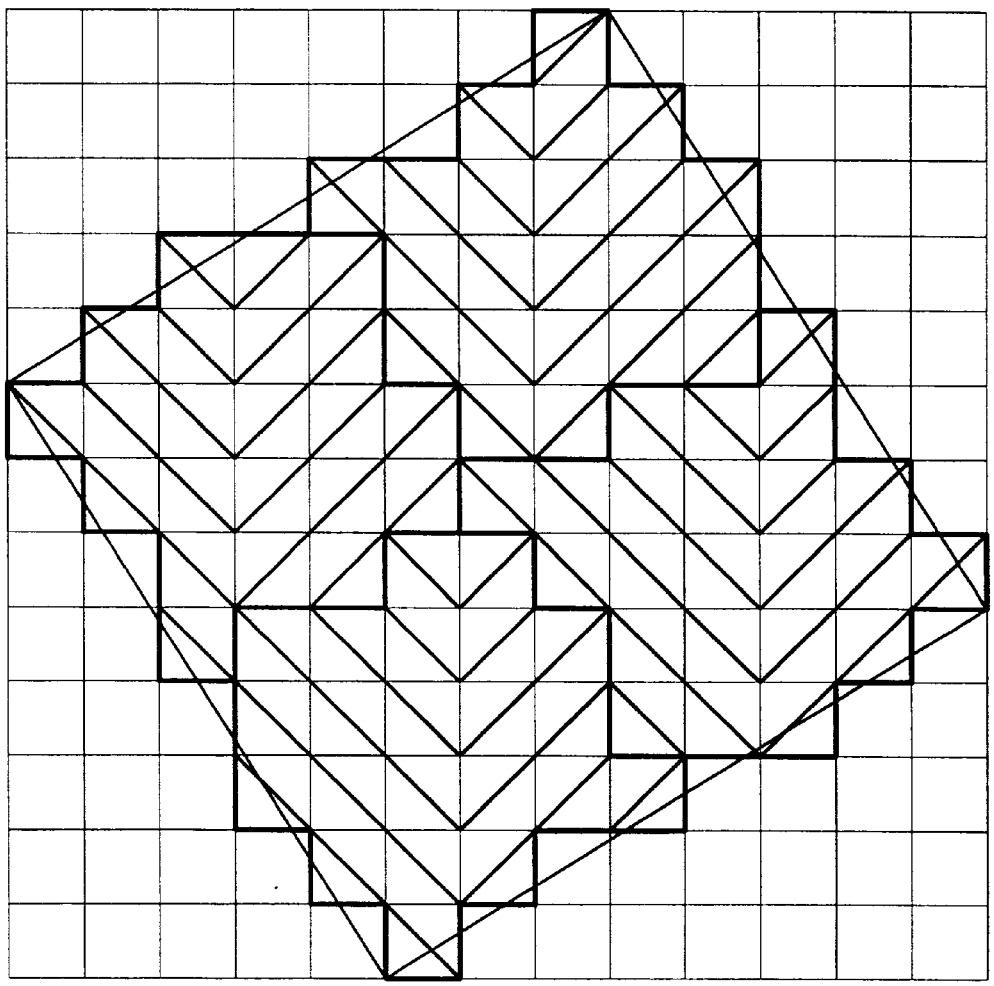
FIG. 19 illustrates the operation of an alternative example of the second illustrative embodiment of the invention.

In the illustrative embodiments described above, the cell selection signal is used to select the threshold value matrix patterns for a single supertile. However, this selection process can be performed for a single halftone cell instead. Generally herein, the threshold patterns over a halftone cell unit is referred to as a "unit threshold pattern". Furthermore, the number of halftone cells that make up a threshold value matrix pattern is arbitrary. For example, it would also be possible to have a single supertile comprise four halftone cells, as shown in FIG. 17–FIG. 19.

Figure 1:
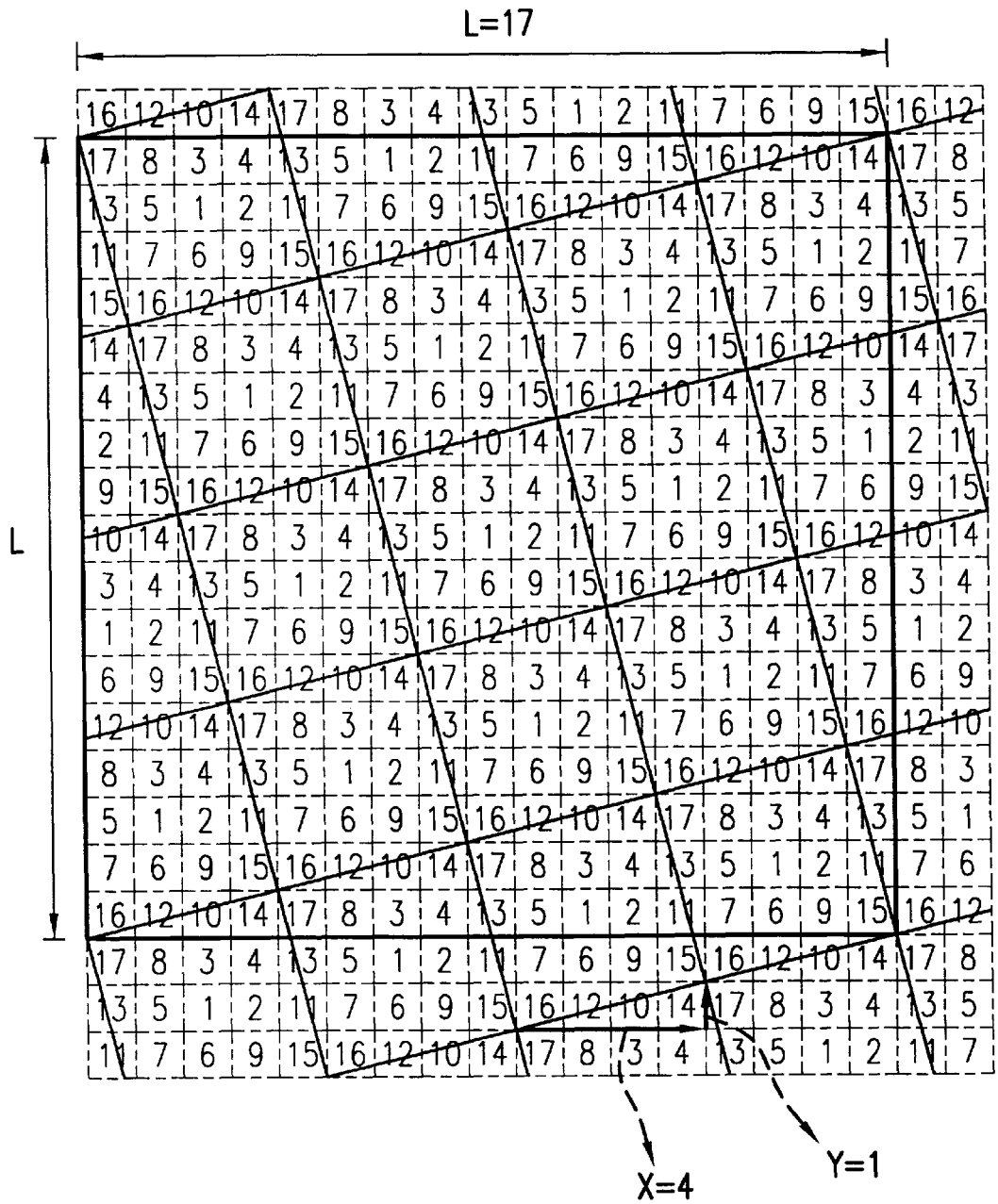
FIG. 1 illustrates the operation of a conventional image processing device according to Japanese Examined Patent Publication Number 52-49361.
Figure 2:
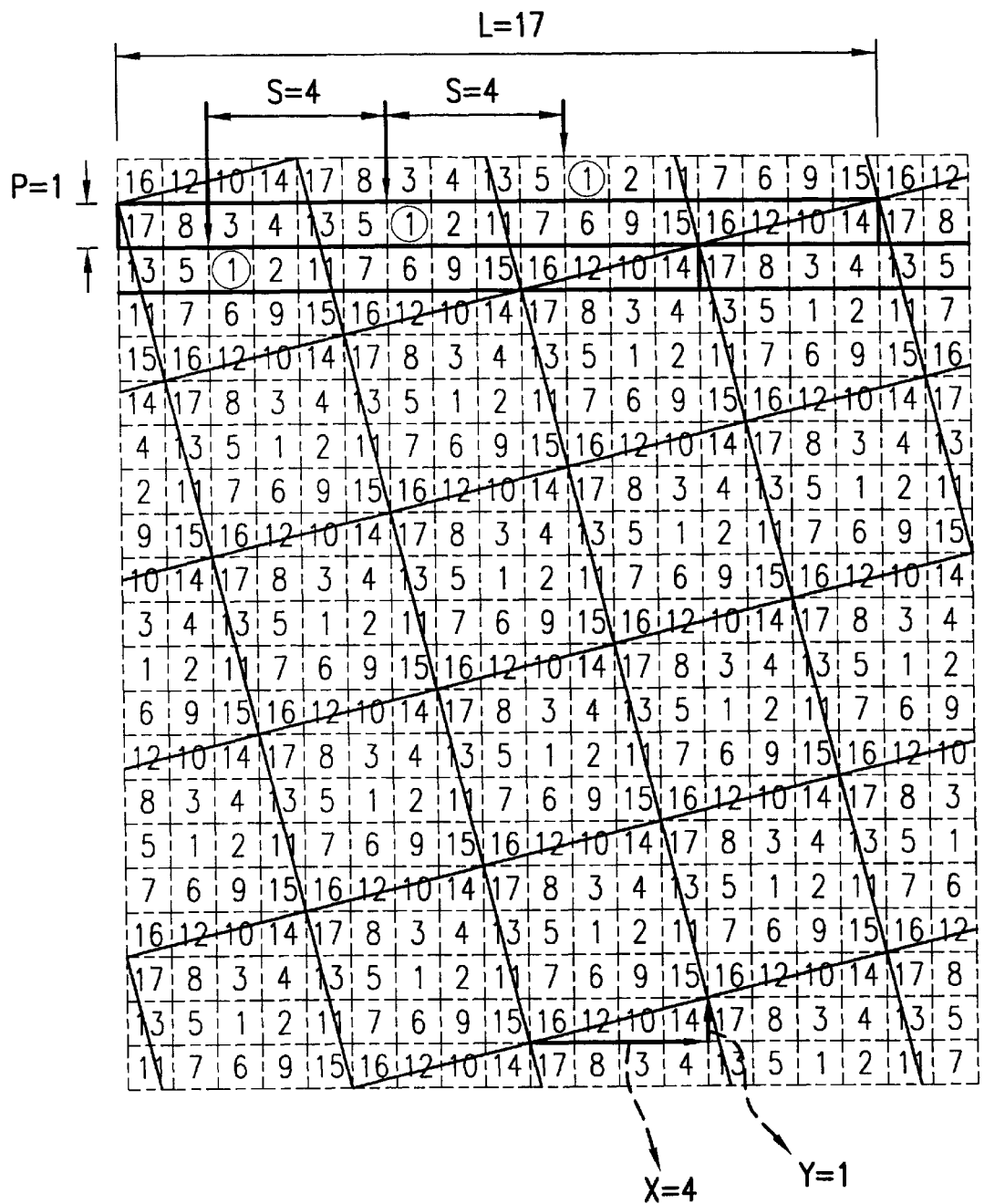
FIG. 2 illustrates the operation of a conventional image processing device according to Japanese Laid-open Publication Number 54-18302.
Figure 3:
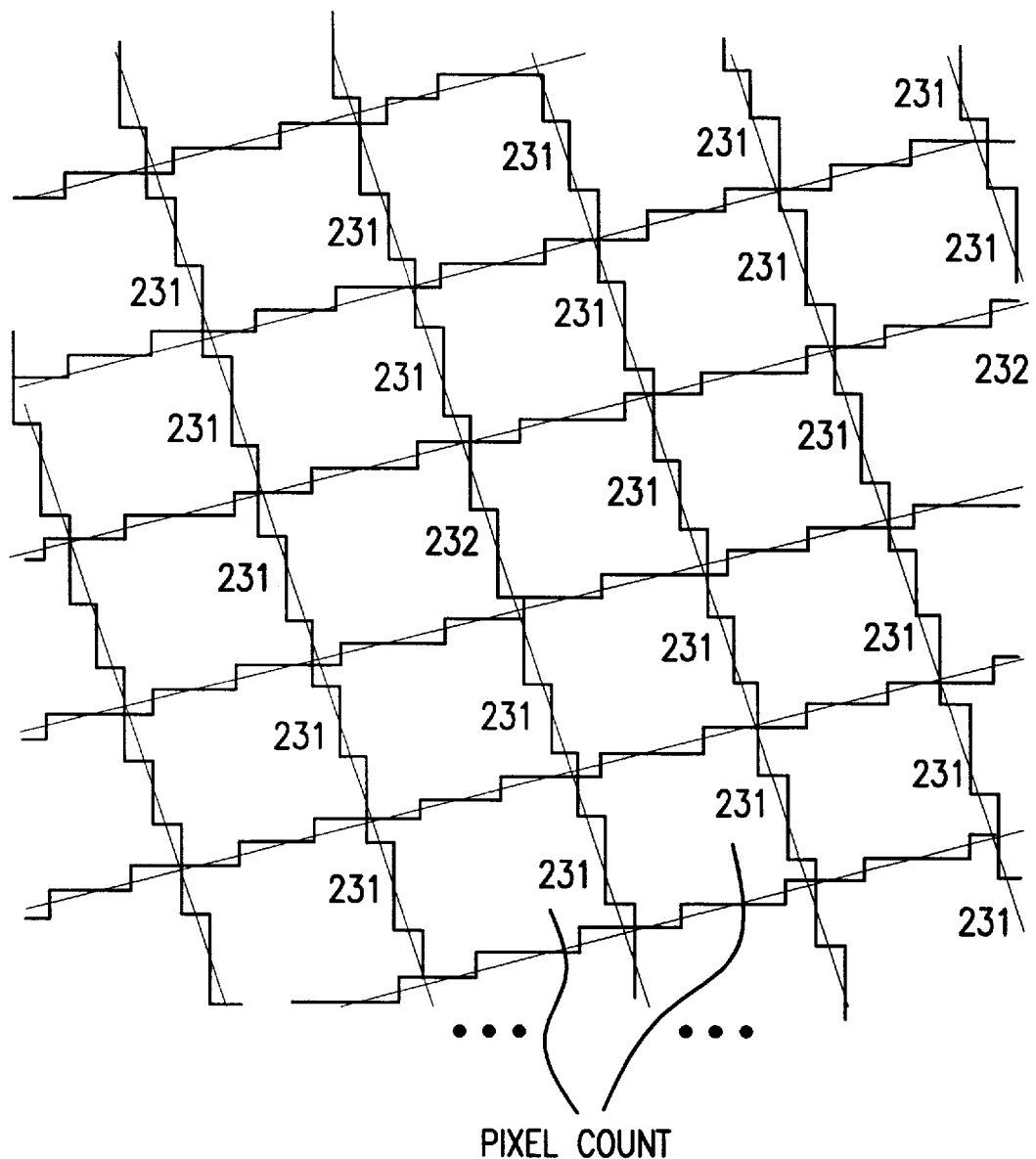
FIG. 3 illustrates the operation of conventional image processing technology.
Figure 4:
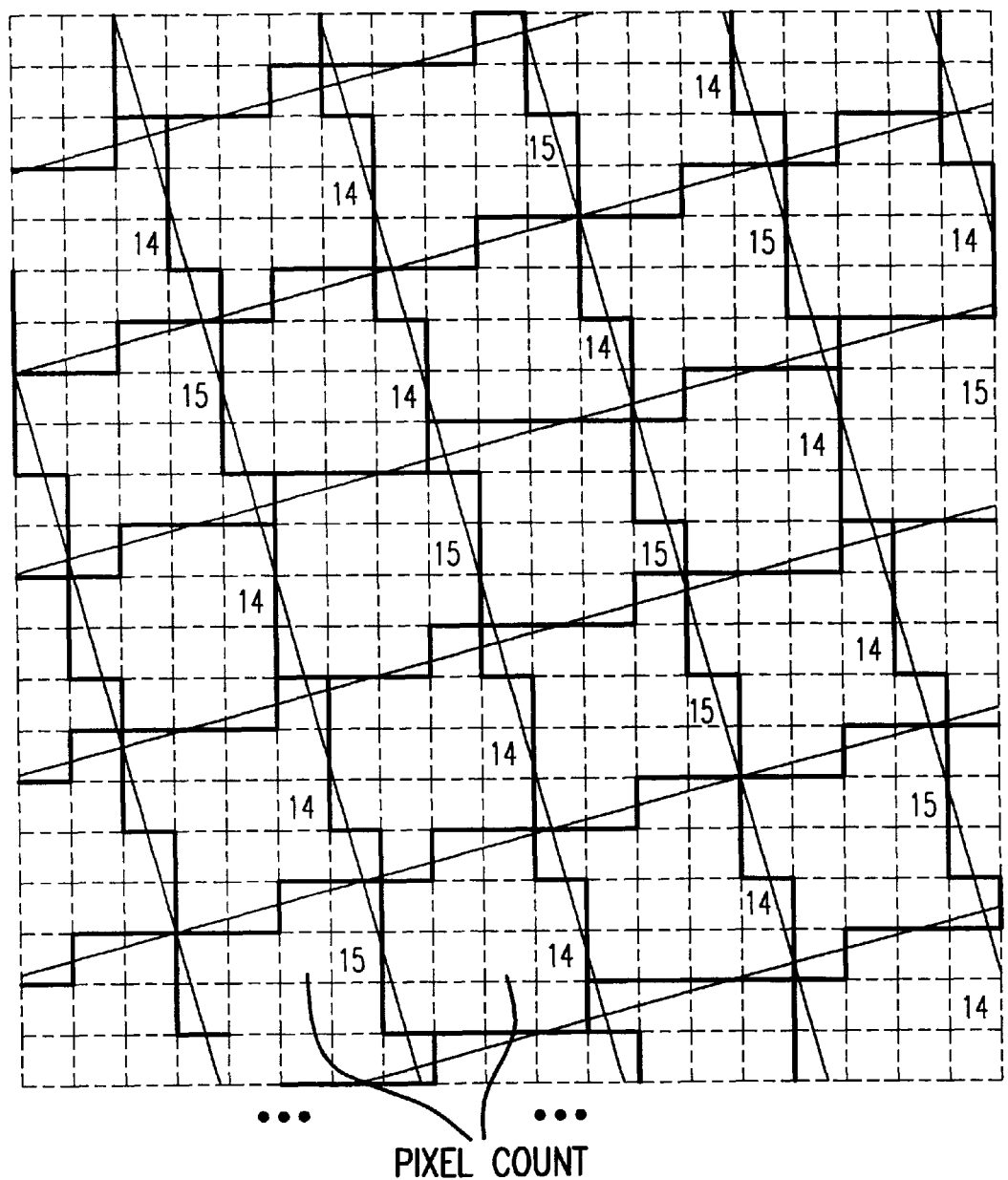
FIG. 4 illustrates the operation of conventional image processing technology.

As shown in FIG. 3, when the shapes or sizes of supertiles are different, cell memory sections 100–109 and a cell selection circuit 113 should be disposed for each supertile type. Also, it would be possible to have cell memory sections 100–109 store threshold value matrix patterns that are large enough to contain the different types of supertiles. Then, based on the supertile type being used, the necessary section can be extracted and stored in screen pattern memory circuit 118.

In the illustrative embodiments described above, command data sent from personal computer 10 is used to generate threshold value matrix patterns, and these are used to process the image data sent from personal computer 10. However, the present invention is not restricted to implementation with this type of computer system. For example, the present invention can also be implemented with copy machines and the like. For implementation with copy machines, predetermined threshold value matrix patterns can be prepared, and these can be used to process image data read in from a scanner or the like.

In the illustrative embodiments described above, threshold value matrix patterns are selected at random for each of the K, Y, M, and C planes. However, as shown in FIG. 26, it would also be possible to link each screen angle to threshold value matrix patterns. A threshold value matrix pattern could be randomly selected for one of the planes (the 0 degree plane, for example), and the threshold value matrix patterns from the other planes can be selected to be the ones that correspond to the threshold value matrix pattern for the 0 degree plane.

What is claimed is:

1. An image processing device comprising:
    first memory means storing a plurality of growth weight value matrix patterns which serve as the elements making up a screen and which have mutually different dot growth patterns;
    pattern selecting means selecting said growth weight value matrix patterns at random;
    screen generating means arranging growth weight value matrix patterns selected by said pattern selecting means and generating said screen; and
    image converting means taking input image data and using said screen generated by said screen generating means to perform conversion into halftone image data using first data that has been quantized based on weight values in said growth weight value matrix pattern and intermediate value data corresponding to a difference between a weight value and said image data.

2. An image processing device as described in claim 1 wherein:
    said first memory means stores a plurality of growth weight value matrix patterns corresponding to a plurality of screen angles and having mutually different dot growth patterns;
    said pattern selecting means selects a growth weight value matrix pattern at random for each of said screen angles; and
    said screen generating means arranges, for each screen angle, growth weight value matrix patterns selected by said pattern selecting means, and generates screen corresponding to said plurality of screen angles.

3. An image processing device comprising:
    first memory means storing a plurality of growth weight value matrix patterns which serve as the elements making up a screen and which have mutually different dot growth patterns;
    pattern selecting means selecting said growth weight value matrix patterns using a prescribed sequence;
    screen generating means arranging growth weight value matrix patterns selected by said pattern selecting means and generating said screen; and
    image converting means taking input image data and using said screen generated by said screen generating means to perform conversion into halftone image data using first data that has been quantized based on weight values in said growth weight value matrix pattern and intermediate value data corresponding to a difference between a weight value and said image data.

4. An image processing device as described in claim 3 wherein:
    said first memory means stores a plurality of growth weight value matrix patterns corresponding to a plurality of screen angles and having mutually different dot growth patterns;
    said pattern selecting means selects a growth weight value matrix pattern according to a prescribed sequence for each of said screen angles; and
    said screen generating means arranges, for each screen angle, growth weight value matrix patterns selected by said pattern selecting means, and generates screen corresponding to said plurality of screen angles.

5. An image processing device as described in claim 1 or claim 3 wherein said image converting means determines said intermediate value data so that said input image data and said halftone image data are equivalent in terms of density.

6. An image processing device as described in claim 1 or claim 3 further comprising:
    analog screen generating means using halftone image data converted by said image converting means to generate an analog screen for creating rendering pulse data; and
    means for setting screen characteristics including phase or frequency of an analog screen to be used for said intermediate value data.

7. An image processing device as described in claim 6 further comprising:
    second memory means corresponding to said growth weight value matrix pattern storing screen characteristic patterns to allow said means for setting characteristics to set said phase or said frequency, wherein
    said means for setting screen characteristics reads said screen characteristic pattern stored in said second memory means to set the phase or frequency of an analog screen used for said intermediate value data.

8. An image processing device as described in claim 6 further comprising:
    second memory means corresponding to said growth weight value matrix pattern storing screen characteristic patterns to allow said means for setting characteristics to set said phase or said frequency, wherein
    said means for setting screen characteristics reads said screen characteristic pattern stored in said second memory means to generate a pulse-width modulation signal from said intermediate value data.

9. An image processing device as described in claim 1 or claim 3 further comprising:
    digital screening means for taking converted halftone data from said image converting means and performing pulse-width modulation to convert said data into pulse signals; and
    means for setting screen characteristics including position of a pulse width when said digital screening means is used to modulate said intermediate value data.

10. An image processing device as described in claim 1 or claim 3 further comprising a laser diode driver generating a density modulation signal based on halftone image data converted by said image converting means.

11. An image processing device as described in claim 1 or claim 3 wherein said growth weight value matrix pattern comprises a plurality of unit growth weight value patterns.

12. An image processing device as described in claim 11 wherein said growth-weight value matrix pattern contains a plurality of unit threshold value patterns having a plurality of mutually different dot growth patterns.

* * * * *